(12) United States Patent
Kim et al.

(10) Patent No.: US 11,650,688 B2
(45) Date of Patent: May 16, 2023

(54) TOUCH SENSING DEVICE, DISPLAY DEVICE INCLUDING THE SAME, AND METHOD OF DRIVING THE SAME

(71) Applicant: SAMSUNG DISPLAY CO., LTD., Yongin-si (KR)

(72) Inventors: Yu Na Kim, Seoul (KR); Soo Jung Lee, Suwon-si (KR); Seung Wook Chun, Daegu (KR); Bo Ram Choi, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 161 days.

(21) Appl. No.: 17/197,169

(22) Filed: Mar. 10, 2021

(65) Prior Publication Data

US 2022/0043528 A1    Feb. 10, 2022

(30) Foreign Application Priority Data

Aug. 5, 2020  (KR) .......................... 10-2020-0097894

(51) Int. Cl.
*G06F 3/041* (2006.01)
*G06F 3/044* (2006.01)

(52) U.S. Cl.
CPC .......... *G06F 3/0416* (2013.01); *G06F 3/0443* (2019.05); *G06F 2203/04101* (2013.01)

(58) Field of Classification Search
USPC ....................................................... 345/174
See application file for complete search history.

(56) References Cited

U.S. PATENT DOCUMENTS

| 2014/0160038 | A1* | 6/2014 | Lee ....................... G06F 3/0446 345/173 |
| 2014/0210776 | A1* | 7/2014 | Kuroiwa ........... G06F 3/041661 345/174 |
| 2015/0169123 | A1* | 6/2015 | Lee ..................... G06F 3/04186 345/174 |
| 2015/0212649 | A1 | 7/2015 | Oshita et al. |
| 2015/0346895 | A1* | 12/2015 | Bokma ............... G06F 3/04883 345/173 |
| 2016/0062525 | A1 | 3/2016 | Kim |

(Continued)

FOREIGN PATENT DOCUMENTS

| EP | 3486758 | 5/2019 |
| KR | 10-1416562 | 7/2014 |

(Continued)

OTHER PUBLICATIONS

Extended European Search Report issued in corresponding European Patent Application No. 21189224.5 dated Jan. 12, 2022.

*Primary Examiner* — Chineyere D Wills-Burns
(74) *Attorney, Agent, or Firm* — F. Chau & Associates, LLC

(57) ABSTRACT

A touch sensing device includes touch electrodes, a sensing circuit unit configured to sense a capacitance change value of each of a plurality of touch nodes formed by the touch electrodes, an analog-digital converter configured to output the capacitance change value of each of the plurality of touch nodes as digital touch sensing data, and a touch data compensator configured to analyze the touch sensing data to calculate a touch area ratio and configured to compensate for the touch sensing data according to the touch area ratio.

19 Claims, 19 Drawing Sheets

(56) References Cited

U.S. PATENT DOCUMENTS

| | | | |
|---|---|---|---|
| 2017/0147131 A1* | 5/2017 | Rhee | G06F 3/04883 |
| 2018/0059866 A1* | 3/2018 | Drake | G06F 3/0446 |
| 2018/0204035 A1* | 7/2018 | Kim | G06F 3/0446 |
| 2018/0217713 A1* | 8/2018 | Bye | G06F 3/0446 |
| 2018/0224964 A1* | 8/2018 | Church | G06F 3/047 |
| 2019/0056820 A1 | 2/2019 | Hoch et al. | |
| 2019/0056823 A1 | 2/2019 | Stevenson et al. | |
| 2019/0146612 A1* | 5/2019 | Yamada | G06F 3/04186 |
| | | | 345/174 |
| 2019/0391723 A1* | 12/2019 | Wang | G06F 3/04186 |
| 2020/0363951 A1 | 11/2020 | Hoch et al. | |
| 2021/0191596 A1* | 6/2021 | Chen | G06F 3/04186 |
| 2021/0255729 A1* | 8/2021 | Jung | G06F 3/0416 |

FOREIGN PATENT DOCUMENTS

| | | |
|---|---|---|
| KR | 10-2016-0025802 | 3/2016 |
| KR | 10-2020-0022296 | 3/2020 |
| KR | 10-2098878 | 4/2020 |

\* cited by examiner

FIG. 10

| | | | | | | | |
|---|---|---|---|---|---|---|---|
| 0 | -8 | 7 | 13 | -3 | 3 | -9 | -5 |
| 2 | -11 | 10 | 14 | -6 | 3 | -10 | -4 |
| 2 | -8 | 12 | 12 | -3 | 1 | -9 | 3 |
| 3 | -8 | 9 | 13 | 1 | 3 | -7 | -1 |
| 8 | -2 | 14 | 16 | 4 | 4 | -10 | 0 |
| 16 | 1 | 17 | 21 | 4 | 9 | -7 | 0 |
| 39 | 22 | 26 | 24 | 12 | 16 | -4 | 6 |
| 156 | 124 | 104 | 72 | 41 | 38 | 13 | 11 |
| 242 | 229 | 241 | 224 | 192 | 182 | 150 | 154 |
| 228 | 219 | 239 | 241 | 228 | 232 | 218 | 226 |
| 228 | 219 | 238 | 242 | 230 | 232 | 224 | 228 |
| 233 | 223 | 236 | 245 | 230 | 241 | 223 | 231 |
| 232 | 218 | 236 | 242 | 234 | 236 | 226 | 230 |
| 228 | 222 | 238 | 246 | 232 | 237 | 225 | 234 |
| 233 | 226 | 238 | 247 | 235 | 239 | 231 | 231 |
| 233 | 225 | 242 | 245 | 234 | 240 | 228 | 232 |
| 238 | 222 | 242 | 242 | 229 | 238 | 229 | 231 |
| 236 | 229 | 248 | 249 | 234 | 244 | 232 | 236 |
| 170 | 156 | 174 | 212 | 218 | 228 | 217 | 240 |
| 37 | 29 | 49 | 73 | 75 | 80 | 77 | 128 |
| 17 | 4 | 19 | 28 | 20 | 24 | 18 | 38 |
| 7 | -3 | 11 | 21 | 10 | 16 | 4 | 16 |
| 5 | -7 | 8 | 13 | 3 | 6 | -3 | 10 |
| 6 | -6 | 4 | 12 | -1 | 3 | -3 | 1 |
| 2 | -10 | 8 | 7 | -5 | 6 | -2 | -2 |
| 0 | -4 | 0 | 9 | -4 | 3 | -8 | -1 |
| 2 | -4 | 4 | 2 | 0 | 2 | -6 | 2 |
| -1 | -13 | -1 | 9 | -1 | 5 | -6 | -1 |
| -2 | -13 | 2 | 8 | -6 | -2 | -8 | -3 |
| 5 | -11 | 4 | 6 | -3 | 5 | -10 | -3 |
| -1 | -14 | 5 | 8 | -5 | 1 | -11 | -5 |
| -3 | -13 | 1 | 7 | -3 | 3 | -5 | 1 |
| -4 | -5 | 6 | 4 | -2 | -2 | -7 | -3 |

FIG. 11

|  |  |  |  |  |  |  |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
| 156 | 124 | 104 |  |  |  |  |
| 242 | 229 | 241 | 224 | 192 | 182 | 150 | 154 |
| 228 | 219 | 239 | 241 | 228 | 232 | 218 | 226 |
| 228 | 219 | 238 | 242 | 230 | 232 | 224 | 228 |
| 233 | 223 | 236 | 245 | 230 | 241 | 223 | 231 |
| 232 | 218 | 236 | 242 | 234 | 236 | 226 | 230 |
| 228 | 222 | 238 | 246 | 232 | 237 | 225 | 234 |
| 233 | 226 | 238 | 247 | 235 | 239 | 231 | 231 |
| 233 | 225 | 242 | 245 | 234 | 240 | 228 | 232 |
| 238 | 222 | 242 | 242 | 229 | 238 | 229 | 231 |
| 236 | 229 | 248 | 249 | 234 | 244 | 232 | 236 |
| 170 | 156 | 174 | 212 | 218 | 228 | 217 | 240 |
|  |  |  |  |  |  |  | 128 |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

← VTD

TOUCH SENSING DEVICE, DISPLAY DEVICE INCLUDING THE SAME, AND METHOD OF DRIVING THE SAME

This application claims priority under 35 U.S.C. § 119 to Korean Patent Application No. 10-2020-0097894, filed on Aug. 5, 2020, the disclosure of which is incorporated by reference herein in its entirety.

TECHNICAL FIELD

The present disclosure relates to a touch sensing device, a display device including the touch sensing device, and a method of driving the touch sensing device.

DISCUSSION OF THE RELATED ART

Recently, display devices for displaying images have been used for various purposes. For example, display devices are applied to various electronic appliances such as smart phones, digital cameras, notebook computers, navigators, and smart televisions.

Such display devices may include a touch sensing unit for sensing a user's touch as one of input interfaces. The touch sensing unit includes touch electrodes driven in a capacitive manner to sense a user's touch.

When a user touches a capacitive touch screen in a large area, the electric charges of touch electrodes may return to their original capacitance, or to a capacitance below a touch threshold capacitance. Thus, sensing data sensed from the capacitance of the touch electrodes where a touch has occurred may be lower than an originally intended value. Therefore, even though the touch occurs, there may be a case in which the user's touch is not recognized.

SUMMARY

According to an embodiment of the present disclosure, a touch sensing device includes touch electrodes, a sensing circuit unit configured to sense a capacitance change value of each of a plurality of touch nodes formed by the touch electrodes, an analog-digital converter configured to output the capacitance change value of each of the plurality of touch nodes as digital touch sensing data, and a touch data compensator configured to analyze the touch sensing data to calculate a touch area ratio and configured to compensate for the touch sensing data according to the touch area ratio.

According to another embodiment of the present disclosure, there is provided a display device including a display unit including a display area having pixels displaying an image, a touch sensing unit overlapping the display area and including a touch sensing area having touch electrodes, and a touch driving circuit electrically connected to the touch electrodes. The touch driving circuit includes a sensing circuit unit configured to sense a capacitance change value of each of a plurality of touch nodes formed by the touch electrodes, an analog-digital convener configured to output the capacitance change value of each of the plurality of touch nodes as digital touch sensing data, and a touch data compensator configured to analyze the touch sensing data to calculate a touch area ratio and configured to compensate for the touch sensing data according to the touch area ratio.

According to another embodiment of the present disclosure, there is provided a method including sensing a capacitance change value of each of a plurality of touch nodes formed by touch electrode and convening the capacitance change into touch sensing data which is digital data, determining the touch sensing data as effective touch data when the touch sensing data is equal to or greater than a threshold value, calculating the number of the effective touch data relative to the number of the plurality of touch nodes as a touch area ratio, and compensating for the touch sensing data according to the touch area ratio.

BRIEF DESCRIPTION OF THE DRAWINGS

The above and other features of the present inventive concept will become more apparent by describing in detail embodiments thereof, with reference to the accompanying drawings, in which:

FIG. 10 is a diagram illustrating touch sensing data calculated by a touch sensing circuit.

FIG. 11 is a diagram illustrating effective touch data;

DETAILED DESCRIPTION OF THE EMBODIMENTS

Figure 1:
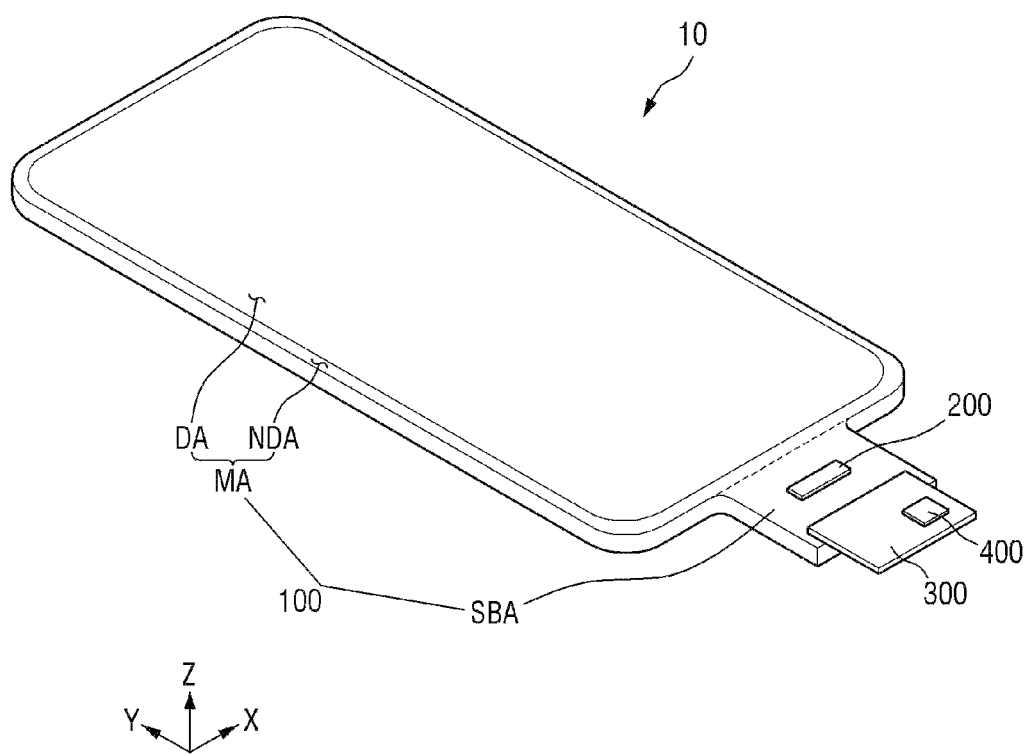
FIG. 1 is a perspective view of a display device according to an embodiment.

Embodiments of the present inventive concept will be described more fully hereinafter with reference to the accompanying drawings. Like reference numerals may refer to like elements throughout the specification and the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" may encompass both an orientation of above and below.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

Hereinafter, embodiments of the present invention will be described with reference to the attached drawings.

Figure 2:
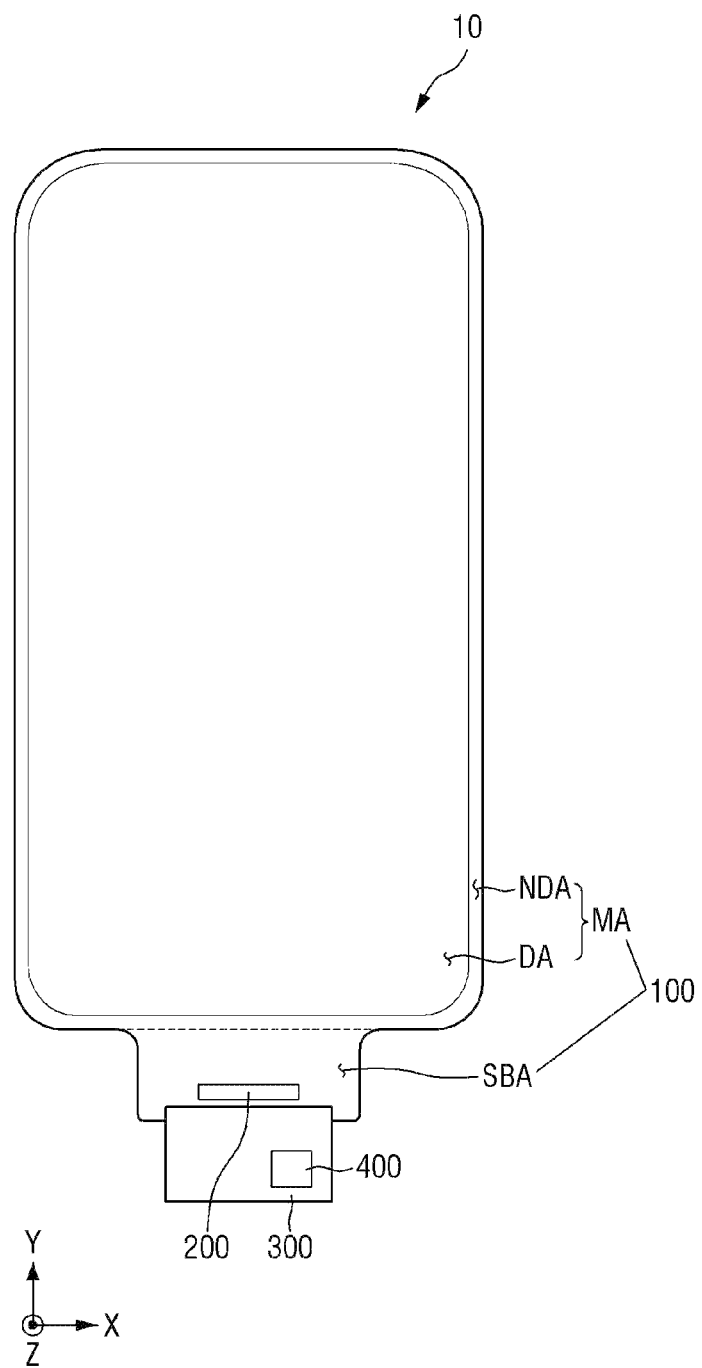
FIG. 2 is a plan view of a display device according to an embodiment.
Figure 3:
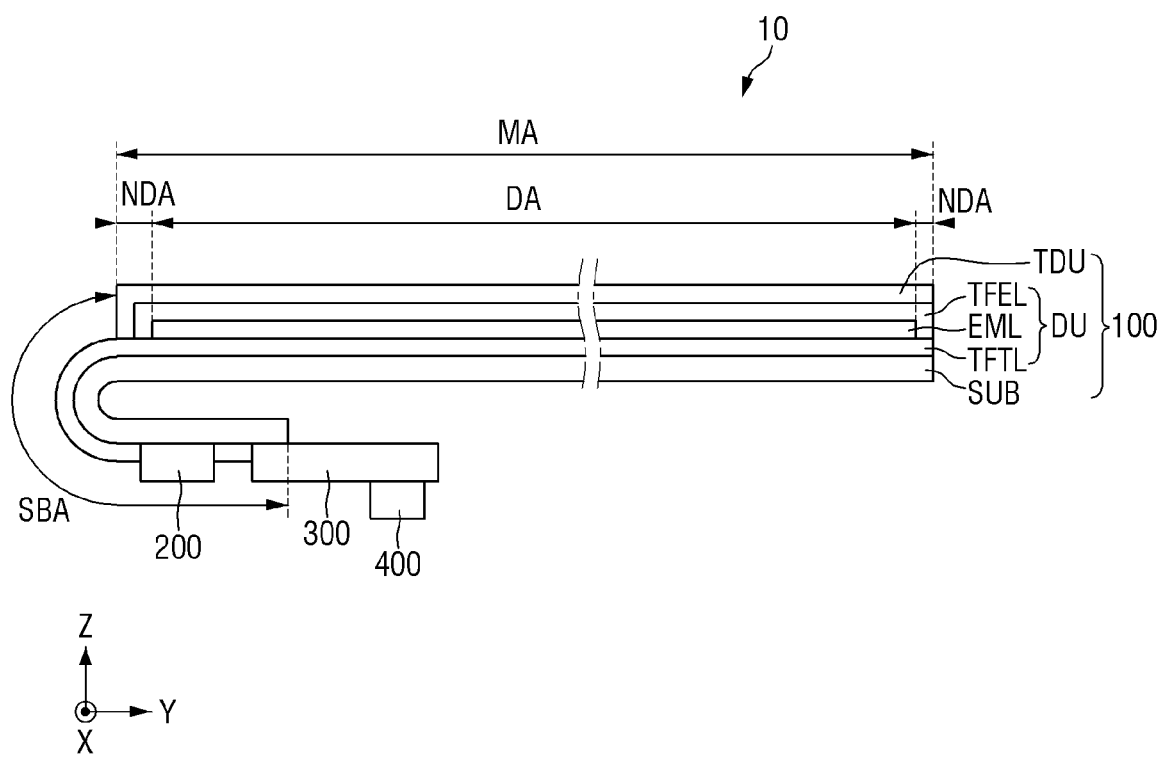
FIG. 3 is a side view of a display device according to an embodiment.

FIG. 1 is a perspective view of a display device according to an embodiment, FIG. 2 is a plan view of a display device according to an embodiment, and FIG. 3 is a side view of a display device according to an embodiment.

Referring to FIGS. 1 to 3, a display device 10 according to an embodiment may be applied to a portable electronic appliance such as a mobile phone, a smart phone, a tablet personal computer (table PC), a mobile communication terminal, an electronic notebook, an e-book, a portable multimedia player (PMP), a navigator, or an ultra mobile PC (UMPC), The display device 10 according to an embodiment may also be applied to a display unit of a television, a notebook, a monitor, a billboard, or internet of things (IOT). The display device 10 according to an embodiment may also be applied to a wearable device such as a smart watch, a watch phone, an eyeglass display, or a head mounted display (HMD). The display device 10 according to an embodiment may also be applied to a center information display placed in a car instrument panel, a car center fascia or a car dashboard, a room mirror display replacing a car side mirror, or a display placed on the back surface of a front seat as an entertainment for a back seat of a car.

The display device 10 may be a light emitting display device such as an organic light emitting display device using an organic light emitting diode, a quantum dot light emitting display device including a quantum dot light emitting layer, an inorganic light emitting display device including an inorganic semiconductor, or a micro or nano light emitting display device using a micro or nano light emitting diode (micro LED or nano LED). Hereinafter, the display device 10 will be mainly described as an organic light emitting display device, but the present inventive concept is not limited thereto.

The display device 10 includes a display panel 100, a display driving circuit 200, a display circuit board 300, and a touch driving circuit 400.

The display panel 100 may have a rectangular planar shape having short sides in a first direction (X-axis direction) and long sides in a second direction (Y-axis direction). The second direction (Y-axis direction) crosses the first direction (X-axis direction). The corner where the short side in the first direction (X-axis direction) meets the long side in the second direction (Y-axis direction) may have a round shape of a predetermined curvature or have a right angle shape. The planar shape of the display panel 100 is not limited to a rectangular shape, and may be formed in another polygonal shape, circular shape, or elliptical shape. The display panel 100 may be formed to be flat, but the present disclosure is not necessarily limited thereto. For example, the display panel 100 may include a curved portion formed at the left and right ends thereof and having a constant curvature or a variable curvature. In addition, the display panel 100 may be flex to be bent, warped, folded, or rolled.

The display panel 100 may include a main area MA and a sub-area SBA.

The main area MA includes a display area DA that displays an image and a non-display area NDA that is a peripheral area to the display area DA. The display area DA includes pixels configured to display an image. The sub-area SBA may protrude from one side of the main area MA in the second direction (Y-axis direction).

Although FIGS. 1 and 2 illustrate a case where the sub-area SBA is unfolded, the sub-area SBA may be bent as shown in FIG. 3, and in this case, the sub-area SBA is disposed on the lower surface of the display panel 100. When the sub-area SBA is bent, the sub-area SBA may overlap the main area MA in a third direction (Z-axis direction). The third direction refers to a thickness direction of the substrate SUB. The display driving circuit 200 may be disposed in the sub-area SBA.

As shown in FIG. 3, the display panel 100 includes a substrate SUB, a thin film transistor layer TFTL, a light emitting element layer EML, an encapsulation layer TFEL, and a touch sensing unit TDU. A display unit DU of FIG. 3 includes a thin film transistor layer TFTL, a light emitting element layer EML, and an encapsulation layer TFEL.

The thin film transistor layer TFTL may be disposed on the substrate SUB. The thin film transistor layer TFTL may be disposed in the main area MA and the sub-area SBA. The thin film transistor layer TFTL includes thin film transistors.

The light emitting element layer EML may be disposed on the thin film transistor layer TFTL. The light emitting element layer EML may be disposed on the display area DA of the main area MA. The light emitting element layer EML includes light emitting elements disposed in light emitting units.

The encapsulation layer TFEL may be disposed on the light emitting element layer EML. The encapsulation layer TFEL, may be disposed in the display area DA and non-display area NDA of the main area MA. The encapsulation layer TFEL may include at least one inorganic layer and at least one organic layer for encapsulating the light emitting element layer EML.

The touch sensing unit TDU may be disposed on the encapsulation layer TFEL. The touch sensing unit TDU may be disposed in the display area DA and non-display area NDA of the main area MA. The touch sensing unit TDU may sense a touch of a person or an object using touch electrodes.

A cover window for protecting the upper portion of the display panel 100 may be disposed on the touch sensing unit TDU. The cover window may be attached onto the touch sensing unit TDU by a transparent adhesive member such as an optically clear adhesive (OCA) film or an optically clear resin (OCR). The cover window may be an inorganic material such as glass, or an organic material such as plastic or polymer. A polarization film may be disposed between the touch sensing unit TDU and the cover window to prevent a decrease in visibility of an image due to the reflection of external light.

The display driving circuit 200 may generate signals and voltages for driving the display panel 100. The display driving circuit 200 may be formed as an integrated circuit (IC) and attached onto the display panel 100 by a chip on glass (COG) method, a chip on plastic (COP) method, or an ultrasonic bonding method, but the present disclosure is not necessarily limited thereto. For example, the display driving circuit 200 may be attached onto the display circuit board 300 in a chip on film (COF) method.

The display circuit board 300 may be attached to one end of the sub-area SBA of the display panel 100. Accordingly, the display circuit board 300 may be electrically connected to the display panel 100 and the display driving circuit 200. The display panel 100 and the display driving circuit 200 may receive digital video data, timing signals, and driving voltages through the display circuit board 300. The display circuit board 300 may be a flexible printed circuit board, a printed circuit board, or a flexible film such as a chip on film, but the present disclosure is not necessarily limited thereto.

The touch driving circuit 400 may be disposed on the display circuit board 300. The touch driving circuit 400 may be formed as an integrated circuit (IC) and attached onto the display circuit board 300.

The touch driving circuit 400 may be electrically connected to touch electrodes of the touch sensing unit TDU. The touch driving circuit 400 applies driving signals to the touch electrodes of the touch sensing unit TDU and measures a capacitance change in mutual capacitance of each of a plurality of touch nodes formed by the touch electrodes. The touch driving circuit 400 may determine a user's touch or a user's proximity according to the capacitance change in mutual capacitance of each of the plurality of touch nodes. The user's touch indicates that an object such as a user's finger or a pen directly contacts one surface of the cover window disposed on the touch sensing unit TDU. The user's proximity may refer to when an object such as a user's finger or a pen is located above but apart from one surface of the cover window.

As shown in FIGS. 1 to 3, in order to reduce the reflection of external light by metal lines and metal electrodes of the display panel 100, the display panel 100 includes the color filter layer CFL including color filters. Accordingly, as it is not necessary to attach a separate anti-reflection member such as a polarizing plate onto the display panel 100, the manufacturing cost of the display device 10 may be reduced.

Figure 4:
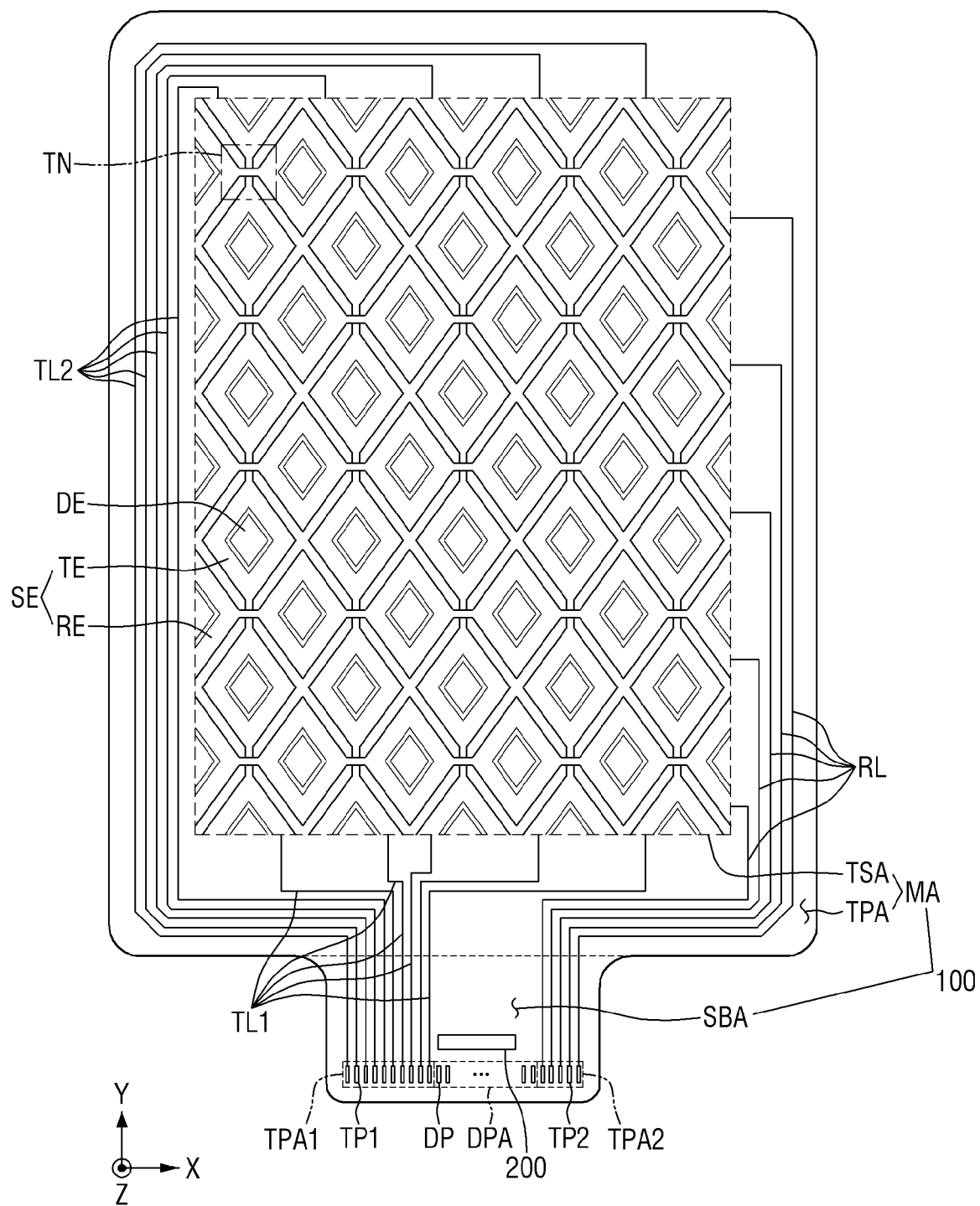
FIG. 4 is a layout view schematically illustrating an example of the touch sensing unit of FIG. 3.

FIG. 4 is a layout view schematically illustrating an example of the touch sensing unit of FIG. 3.

Although it is illustrated in FIG. 4 that the touch electrodes SE of the touch sensing unit TDU may include two types of electrodes, for example, driving electrodes TE and sensing electrodes RE, and that the touch sensing unit TDU may be driven by a mutual capacitance method in which the capacitance change in mutual capacitance of each of the plurality of touch nodes is sensed through the sensing electrodes RE after applying touch driving signals to the driving electrodes TE, the present invention is not necessarily limited thereto.

In FIG. 4, for convenience of description, only driving electrodes TE, sensing electrodes RE, dummy patterns DE, touch lines TL1, TL2 and RL, and touch pads TP1 and TP2 are shown.

Referring to FIG. 4, the touch sensing unit TDU includes a touch sensing area TSA for sensing a user's touch and a touch peripheral area TPA disposed around the touch sensing area TSA. The touch sensing area TSA may overlap the display area DA of FIGS. 1 to 3, and the touch peripheral area TPA may overlap the non-display area NDA of FIGS. 1 to 3.

The touch sensing area TSA includes driving electrodes TE, sensing electrodes RE, and dummy patterns DE. The driving electrodes TE and the sensing electrodes RE may be electrodes for forming mutual capacitance in order to sense a touch of an object or a person.

The sensing electrodes RE may be arranged in parallel to each other in the first direction (X-axis direction) and the second direction (Y-axis direction). The sensing electrodes RE may be electrically connected to each other in the first direction (X-axis direction). The sensing electrodes RE adjacent in the first direction (X-axis direction) may be connected to each other. The sensing electrodes RE adjacent in the second direction (Y-axis direction) may be electrically separated from each other. Thus, touch nodes TN at which mutual capacitance is formed may be disposed at the intersections of the driving electrodes TE and the sensing electrodes RE.

Figure 5:
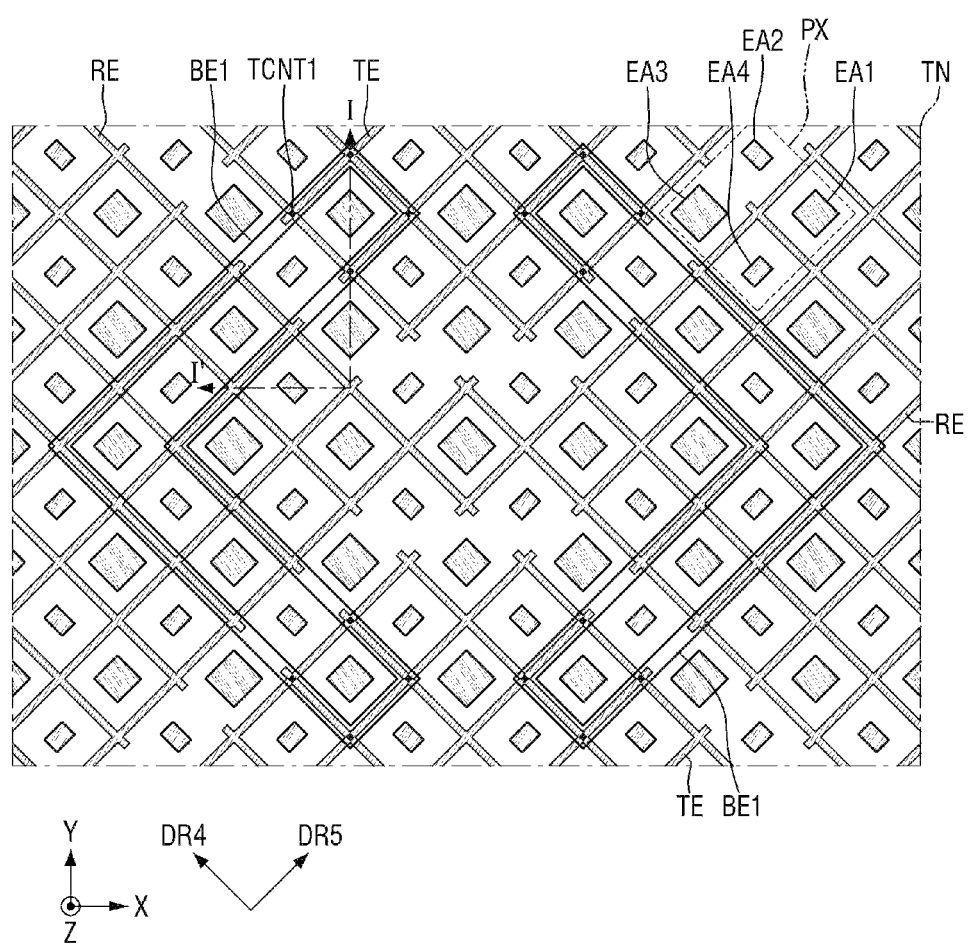
FIG. 5 is an enlarged plan view specifically illustrating an example of the touch node of FIG. 4.

The driving electrodes TE may be arranged in parallel to each other in the first direction (X-axis direction) and the second direction (Y-axis direction). The driving electrodes TE adjacent in the first direction (X-axis direction) may be electrically separated from each other. The driving electrodes TE may be electrically connected to each other in the second direction (Y-axis direction). For example, the driving electrodes TE adjacent in the second direction (Y-axis direction) may be connected to each other through a connection electrode BE1 as shown in FIG. 5.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

Although it is illustrated in FIG. 4 that each of the driving electrodes TE, the sensing electrodes RE, and the dummy patterns DE has a rhombic planar shape, the shape thereof is not limited thereto. For example, each of the driving electrodes TE, the sensing electrodes RE, and the dummy patterns DE may have a planar shape of a rectangle other than a rhombus, a polygon other than a rectangle, a circle, or an ellipse.

The touch lines TL1, TL2, and RL may be arranged in the touch peripheral area TPA. The touch lines TL1, TL2, and RL include touch sensing lines RL connected to the sensing electrodes RE, and first touch driving lines TL1 and second touch driving lines TL2 connected to the driving electrodes TE.

The sensing electrodes RE arranged at one side of the touch sensing area TSA may be connected to the touch sensing lines RL in a one-to-one manner. For example, as shown in FIG. 4, among the sensing electrodes RE electrically connected in the first direction (X-axis direction), the sensing electrode RE disposed at the right end may be connected to the touch sensing line RL. The touch sensing lines RL may be connected to second touch pads TP2 in a one-to-one manner. The touch pads, and specifically the second touch pads TP2 may be connected to the touch driving circuit 400. Therefore, the touch driving circuit 400 may be electrically connected to the sensing electrodes RE.

The driving electrodes TE arranged at one side of the touch sensing area TSA may be connected to the first touch driving lines TL1 in a one-to-one manner, and the driving electrodes TE arranged at the other side of the touch sensing area TSA may be connected to the second touch driving lines TL2 in a one-to-one manner. For example, as shown in FIG. 4, among the driving electrodes TE electrically connected in the second direction (Y-axis direction), the driving electrodes TE disposed at the lower end may be connected to the first touch driving line TL1, and the driving electrodes TE disposed at the upper end may be connected to the second touch driving line TL2. The second touch driving lines TL2 may be connected to the driving electrodes TE at the upper side of the touch sensing area TSA via the outer left side of the touch sensing area TSA.

The first touch driving lines TL1 and the second touch driving lines TL2 may be connected to the first touch pads TP1 in a one-to-one manner. The first touch pads TP1 may be connected to the touch driving circuit 400. Therefore, the touch driving circuit 400 may be electrically connected to the driving electrodes TE. Since the driving electrodes TE are connected to the touch driving lines TL1 and TL2 at both sides of the touch sensing area TSA to receive a touch driving signal, due to an RC delay of the touch driving signal, it is possible to prevent a difference between the touch driving signal applied to the driving electrodes TE disposed under the touch sensing area TSA and the touch driving signal applied to the driving electrodes TE disposed on the touch sensing area TSA.

The first touch pad area TPA1 in which the first touch pads TP1 are disposed may be disposed at one side of the display pad area DPA in which the display pads DP are disposed. The second touch pad area TPA2 in which the second touch pads TP2 are disposed may be disposed at the other side of the display pad area DPA. The display pads DP may be electrically connected to data lines of the display panel 100.

The display pad area DPA, the first touch pad area TPA1, and the second touch pad area TPA2 may correspond to the pads of the display panel 100 connected to the display circuit board 300 shown in FIG. 2. The display circuit board 300 may be disposed on the display pads DP, the first touch pads TP1, and the second touch pads TP2. The display pads DP, the first touch pads TP1, and the second touch pads TP2 may be electrically connected to the display circuit board 300 using a low-resistance and high-reliability material such as an anisotropic conductive film or SAP. Therefore, the display pads DP, the first touch pads TP1, and the second touch pads TP2 may be electrically connected to the touch driving circuit 400 disposed on the display circuit board 300.

FIG. 5 is an enlarged plan view illustrating an example of the touch node of FIG. 4.

Referring to FIG. 5, the touch node TN may be defined as an intersection of the driving electrode TE and the sensing electrode RE.

Since the driving electrodes TE and the sensing electrodes RE are disposed on the same layer, they may be spaced apart from each other. That is, a gap may be formed between the driving electrode TE and the sensing electrode RE adjacent to each other.

The dummy pattern DE may also be disposed on the same layer as the driving electrodes TE and the sensing electrodes RE. That is, a gap may be formed between the driving electrode TE and the dummy pattern DE adjacent to each other and between the sensing electrode RE and the dummy pattern DE adjacent to each other.

The connection electrodes BE1 may be disposed on a different layer from the driving electrodes TE and the sensing electrodes RE. The connection electrode BE1 may be bent at least once. Although it is illustrated in FIG. 5 that the connection electrode BE1 has a bracket shape ("<" or ">"), the planar shape of the connection electrode BE1 is not limited thereto. Since the driving electrodes TE adjacent to each other in the second direction (Y-axis direction) are connected by the plurality of connection electrodes BE1, the driving electrodes TE adjacent to each other in the second direction (Y-axis direction) may be stably connected even if any one of the connection electrodes BE1 is disconnected. Although it is illustrated in FIG. 5 that the driving electrodes TE adjacent to each other are connected by the two connection electrodes BE1, the number of connection electrodes BE1 is not necessarily limited thereto.

The connection electrode BE1 may overlap the driving electrodes TE adjacent in the second direction (Y-axis direction) in the third direction (Z-axis direction) that is the thickness direction of the substrate SUB. The connection electrode BE1 may overlap the sensing electrode RE in the third direction (Z-axis direction). One side of the connection electrode BE1 may be connected to any one of the driving electrodes TE adjacent in the second direction (Y-axis direction) through a touch contact hole TCNT1. The other side of the connection electrode BE1 may be connected to another driving electrode TE of the driving electrodes TE adjacent in the second direction (Y-axis direction) through the touch contact hole TCNT1.

The driving electrodes TE and the sensing electrodes RE may be electrically separated at their intersections. Accordingly, mutual capacitance may be formed between the driving electrodes TE and the sensing electrodes RE.

Each of the driving electrodes TE, the sensing electrodes RE, and the connection electrodes BE1 may have a planar shape of a mesh structure or a network structure. Each of the dummy patterns DE may have a planar shape of a mesh structure or a network structure. Accordingly, the driving electrodes TE, the sensing electrodes RE, the connection electrodes BE1, and the dummy patterns DE may not overlap the light emitting units EA1, EA2, EA3, and EA4 of each of the pixels PX. Therefore, light emitted from the light emitting units EA1, EA2, EA3, and EA4 is not covered by the driving electrodes TE, the sensing electrodes RE, the connection electrodes BE), and the dummy patterns DE, thereby preventing the reduction in luminance of light.

Each of the pixels PX includes a first light emitting unit EA1 that emits light of a first color, a second light emitting unit EA2 that emits light of a second color, a third light emitting unit EA3 that emits light of a third color, and a fourth light emitting unit EA4 that emits light of a second color. For example, the first color may be red, the second color may be green, and the third color may be blue.

In each of the pixels PX, the first light emitting unit EA1 and the second light emitting unit EA2 may be adjacent to each other in the fourth direction DR4, and the third light emitting unit EA3 and the fourth light emitting unit EA4 may be adjacent to each other in the fourth direction DR4.

Further, in each of the pixels PX, the first light emitting unit EA1 and the fourth light emitting unit EA4 may be adjacent to each other in the fifth direction DR5, and the second light emitting unit EA2 and the third light emitting unit EA3 may be adjacent to each other in the fifth direction DR5.

Each of the first light emitting unit EA1, the second light emitting unit EA2, the third light emitting unit EA3, and the fourth light emitting unit EA4 may have a rhombus planar shape or a rectangular planar shape, but the shape thereof is not limited thereto. Each of the first light emitting unit EA1, the second light emitting unit EA2, the third light emitting unit EA3, and the fourth light emitting unit EA4 may have a planar shape of a polygon other than a rectangle, a circle, or an ellipse. Although it is illustrated in FIG. 5 that the area of the third light emitting unit EA3 is the largest, and each of the area of the second light emitting unit EA2 and the fourth light emitting unit EA4 is the smallest, the present invention is not limited thereto.

The second light emitting units EA2 and the fourth light emitting units EA4 may be arranged in odd rows. The second light emitting units EA2 and the fourth light emitting units EA4 may be arranged in parallel to each other in the first direction (X-axis direction) in each of the odd rows. The second light emitting units EA2 and the fourth light emitting units EA4 may be arranged alternately in each of the odd rows. Each of the second light emitting units EA2 may have long sides in the fourth direction DR4 and short sides in the fifth direction DR5, whereas each of the fourth light emitting units EA4 may have short sides in the fourth direction DR4 and long sides in the fifth direction DR5. The fourth direction DR4, which is a direction between the first direction (X-axis direction) and the second direction (Y-axis direction), may be a direction inclined by 45☐ with respect to the first direction (X-axis direction). The fifth direction DR5 may be a direction orthogonal to the fourth direction DR4.

The first light emitting units EA1 and the third light emitting units EA3 may be arranged in even rows. The first light emitting units EA1 and the third light emitting units EA3 may be arranged in parallel to each other in the first direction (X-axis direction) in each of the even rows. The first light emitting units EA1 and the third light emitting units EA3 may be arranged alternately in each of the even rows.

The second light emitting units EA2 and the fourth light emitting units EA4 may be arranged in odd columns. The second light emitting units EA2 and the fourth light emitting units EA4 may be arranged in parallel to each other in the second direction (Y-axis direction) in each of the odd columns. The second light emitting units EA2 and the fourth light emitting units EA4 may be arranged alternately in each of the odd columns.

The first light emitting units EA1 and the third light emitting units EA3 may be arranged in even columns. The first light emitting units EA1 and the third light emitting units EA3 may be arranged in parallel to each other in the second direction (Y-axis direction) in each of the even columns. The first light emitting units EA1 and the third light emitting units EA3 may be arranged alternately in each of the even columns.

Figure 6:
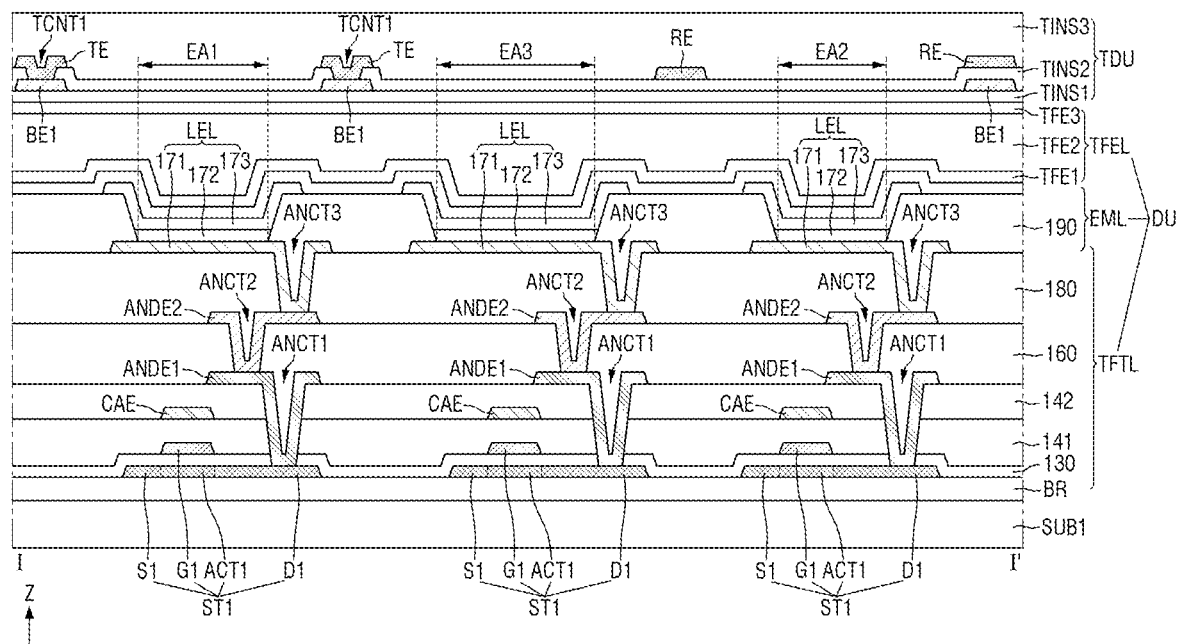
FIG. 6 is a cross-sectional view illustrating an example of a display panel taken along the line I-I' of FIG. 5.

FIG. 6 is a cross-sectional view illustrating an example of a display panel taken along the line I-I' of FIG. 5.

Referring to FIG. 6, a barrier layer BR may be disposed on a substrate SUB. The substrate SUB may be made of an insulating material such as a polymer resin. For example, the substrate SUB may be made of polyimide. The substrate SUB may be a flexible substrate capable of bending, folding, or rolling.

The barrier layer BR is a layer for protecting thin film transistors of a thin film transistor layer TFTL and a light emitting layer 172 of a light emitting element layer EML from moisture penetrating through the substrate SUB vulnerable to moisture permeation. The barrier layer BR may include a plurality of inorganic layers that are alternately stacked. For example, the barrier layer BR may be formed as a multilayer in which one or more inorganic layers of a silicon nitride layer, a silicon oxy nitride layer, a silicon oxide layer, a titanium oxide layer, and an aluminum oxide layer are alternately stacked.

A thin film transistor ST1 may be disposed on the barrier layer BR. The thin film transistor ST1 includes an active layer ACT1, a gate electrode G1, a source electrode S1, and a drain electrode D1.

The active layer ACT1, the source electrode S1, and the drain electrode D1 of the thin film transistor ST1 may be disposed on the barrier layer BR. The active layer ACT1 of the thin film transistor ST1 may include polycrystalline silicon, single crystal silicon, low-temperature polycrystalline silicon, amorphous silicon, or an oxide semiconductor. The active layer ACT1 overlapping the gate electrode G1 in the third direction (Z-axis direction) that is a thickness direction of the substrate SUB may be defined as a channel region. The source electrode S1 and the drain electrode D1 are regions that do not overlap the gate electrode G1 in the third direction (Z-axis direction), and may include a silicon semiconductor or an oxide semiconductor doped with ions or impurities.

A gate insulating layer 130 may be disposed on the active layer ACT1, the source electrode S1, and the drain electrode D1 of the thin film transistor ST1. The gate insulating layer 130 may include an inorganic layer, for example, a silicon nitride layer, a silicon oxy nitride layer, a silicon oxide layer, a titanium oxide layer, or an aluminum oxide layer.

A gate electrode G1 of the thin film transistor ST1 may be disposed on the gate insulating layer 130. The gate electrode G1i may overlap the active layer ACT1 in the third direction (Z-axis direction). The gate electrode G1 may include a single layer or multiple layers including any one of molybdenum (Mo), aluminum (Al), chromium (Cr), gold (Au), titanium (Ti), nickel (Ni), neodymium (Nd), and copper (Cu), or an alloy thereof.

A first interlayer insulating layer 141 may be disposed on the gate electrode G1 of the thin film transistor ST1. The first interlayer insulating layer 141 may include an inorganic layer, for example, a silicon nitride layer, a silicon oxy nitride layer, a silicon oxide layer, a titanium oxide layer, or an aluminum oxide layer. The first interlayer insulating layer 141 may include a plurality of inorganic layers.

A capacitor electrode CAE may be disposed on the first interlayer insulating layer 141. The capacitor electrode CAE may overlap the gate electrode G1 of the thin film transistor ST1 in the third direction (Z-axis direction). Since the first interlayer insulating layer 141 has a predetermined dielectric constant, a capacitor may be formed by the capacitor electrode CAE, the gate electrode G1, and the first interlayer insulating layer 141 disposed therebetween. The capacitor electrode CAE may be formed as a single layer or multiple layers including any one of molybdenum (Mo), aluminum (Al), chromium (Cr), gold (Au), titanium (Ti), nickel (Ni), neodymium (Nd), and copper (Cu), or an alloy thereof.

A second interlayer insulating layer 142 may be disposed on the capacitor electrode CAE. The second interlayer insulating layer 142 may include an inorganic layer, for example, a silicon nitride layer, a silicon oxy nitride layer, a silicon oxide layer, a titanium oxide layer, or an aluminum oxide layer. The second interlayer insulating layer 142 may include a plurality of inorganic layers.

A first anode connection electrode ANDE1 may be disposed on the second interlayer insulating layer 142. The first anode connection electrode ANDE1 may be connected to the drain electrode D1 of the thin film transistor ST1 through a first connection contact hole ANCT1 penetrating the gate insulating layer 130, the first interlayer insulating layer 141, and the second interlayer insulating layer 142. The first anode connection electrode ANDE1 may be formed as a single layer or multiple layers including any one of molybdenum (Mo), aluminum (Al), chromium (Cr), gold (Au), titanium (Ti), nickel (Ni), neodymium (Nd), and copper (Cu), or an alloy thereof.

A first planarization layer 160 for flattening a step due to the thin film transistor ST1 may be disposed on the first anode connection electrode ANDE1. The first planarization layer 160 may include an organic layer including acrylic resin, epoxy resin, phenolic resin, polyamide resin, or polyimide resin.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may be formed as a single layer or multiple layers including any one of molybdenum (Mo), aluminum (Al), chromium (Cr), gold (Au), titanium (Ti), nickel (Ni), neodymium (Nd), and copper (Cu), or an alloy thereof.

A second planarization layer 180 may be disposed on the second anode connection electrode ANDE2. The second planarization layer 180 may include an organic layer including acrylic resin, epoxy resin, phenolic resin, polyamide resin, or polyimide resin.

Light emitting elements LEL and a bank 190 may be disposed on the second planarization layer 180. Each of the light emitting elements LEL includes a pixel electrode 171, a light emitting layer 172, and a common electrode 173.

The pixel electrode 171 may be disposed on the second planarization layer 180. The pixel electrode 171 may be connected to the second anode connection electrode ANDE2 through a third connection contact hole ANCT3 penetrating the second planarization layer 180.

In a top emission structure in which light is emitted toward the common electrode 173 based on the light emitting layer 172, the pixel electrode 171 may include a high-reflectivity metal material such as a laminated structure (Ti/Al/Tri) of aluminum and titanium, a laminated structure (ITO/Al/ITO) of aluminum and indium tin oxide (ITO), an APC alloy, or a laminated structure (ITO/APC/ITO) of APC alloy and ITO. The APC alloy is an alloy of silver (Ag), palladium (Pd), and copper (Cu).

In order to define the first light emitting unit EA1, the second light emitting unit EA2, the third light emitting unit EA3, and the fourth light emitting unit EA4, the bank 190 may be formed to partition the pixel electrode 171 on the second planarization layer 180. The bank 190 may be disposed to cover the edge of the pixel electrode 171. The bank 190 may include an organic film including an acrylic resin, an epoxy resin, a phenolic resin, a polyamide resin, or a polyimide resin.

Each of the first light emitting unit EA1, the second light emitting unit EA2, the third light emitting unit EA3, and the fourth light emitting unit EA4 indicates an area in which the pixel electrode 171, the light emitting layer 172, and the common electrode 173 are sequentially stacked. Accordingly, holes from the pixel electrode 171 and electrons from the common electrode 173 are combined with each other in the light emitting layer 172 to emit light.

The light emitting layer 172 may be disposed on the pixel electrode 171 and the bank 190. The light emitting layer 172 may include an organic material and emit light of a predetermined color. For example, the light emitting layer 172 may include a hole transporting layer, an organic material layer, and an electron transporting layer.

The common electrode 173 may be disposed on the light emitting layer 172. The common electrode 173 may cover the light emitting layer 172. The common electrode 173 may be a common layer commonly formed in the first light emitting unit EA1, the second light emitting unit EA2, the third light emitting unit EA3, and the fourth light emitting unit EA4. A capping layer may be formed on the common electrode 173.

In the top emission structure, the common electrode 173 may include a transparent conductive material (TCO) such as ITO or IZO that can transmit light, or a semi-transmissive conductive material such as magnesium (Mg), silver (Ag), or an alloy of magnesium (Mg) and silver (Ag). When the common electrode 173 is formed of a semi-transmissive conductive material, light emission efficiency may be increased due to micro cavities.

An encapsulation layer TFEL may be disposed on the common electrode 173. The encapsulation layer TFEL includes at least one inorganic layer to prevent the penetration of oxygen or moisture into the light emitting element layer EML. In addition, the encapsulation layer TFEL includes at least one organic layer to protect the light emitting element layer EML from foreign matter such as dust. For example, the encapsulation layer TFEL includes a first inorganic encapsulation layer TFE1, an organic encapsulation layer TFE2, and a second inorganic encapsulation layer TFE3.

The first inorganic encapsulation layer TFE1 may be disposed on the common electrode 173, the organic encapsulation layer TFE2 may be disposed on the first inorganic encapsulation layer TFE1, and the second inorganic encapsulation layer TFE3 may be disposed on the organic encapsulation layer TFE2. Each of the first inorganic encapsulation layer TFE1 and the second inorganic encapsulation layer TFE3 may be formed as a multilayer in which one or more inorganic layers of silicon nitride layer, silicon oxy nitride layer, silicon oxide layer, titanium oxide layer, and aluminum oxide layer are alternately stacked. The organic encapsulation layer TFE2 may be an organic layer including an acrylic resin, an epoxy resin, a phenolic resin, a polyamide resin, or a polyimide resin.

A touch sensing unit TDU may be disposed on the encapsulation layer TFEL. The touch sensing unit TDU includes a first touch insulating layer TINS1, a connection electrode BE1, a second touch insulating layer TINS2, a driving electrode TE, a sensing electrode RE, and a third touch insulating layer TINS3.

The first touch insulating layer TINS1 may include an inorganic layer, for example, a silicon nitride layer, a silicon oxynitride layer, a silicon oxide layer, a titanium oxide layer, or an aluminum oxide layer.

The connection electrode BE1 may be disposed on the first touch insulating layer TINS1. The connection electrode BE1 may be formed as a single layer or multiple layers including any one of molybdenum (Mo), aluminum (Al), chromium (Cr), gold (Au), titanium (Ti), nickel (Ni), neodymium (Nd), and copper (Cu), or an alloy thereof.

The second touch insulating layer TINS2 is disposed on the connection electrode BE1. The second touch insulating layer TINS2 may include an inorganic layer, for example, a silicon nitride layer, a silicon oxynitride layer, a silicon oxide layer, a titanium oxide layer, or an aluminum oxide layer. Alternatively, the second touch insulating layer TINS2 may be an organic layer including an acrylic resin, an epoxy resin, a phenolic resin, a polyamide resin, or a polyimide resin.

The driving electrodes TE and the sensing electrodes RE may be disposed on the second touch insulating layer TINS2. In addition to the driving electrodes TE and the sensing electrodes RE, the dummy patterns DE, the first touch driving lines TL1, the second touch driving lines TL2, and the touch sensing lines RL, which are shown in FIG. 4, may be disposed on the second touch insulating layer TINS2. The driving electrodes TE and the sensing electrodes RE may be formed as a single layer or multiple layers including any one of molybdenum (Mo), aluminum (Al), chromium (Cr), gold (Au), titanium (Ti), nickel (Ni), neodymium (Nd), and copper (Cu), or an alloy thereof.

The driving electrode TE and the sensing electrode RE may overlap the connection electrode BE1 in the third direction (Z-axis direction). The driving electrode TE may be connected to the connection electrode BE1 through a touch contact hole TCNT1 penetrating the second touch insulating layer TINS2.

The third touch insulating layer TINS3 is formed on the driving electrodes TE and the sensing electrodes RE. The third touch insulating layer TINS3 may serve to flatten any uneven surfaces formed by the driving electrodes TE, the sensing electrodes RE, and the connection electrodes BE1. The third touch insulating layer TINS3 may be an organic layer including an acrylic resin, an epoxy resin, a phenolic resin, a polyamide resin, or a polyimide resin.

Figure 7:
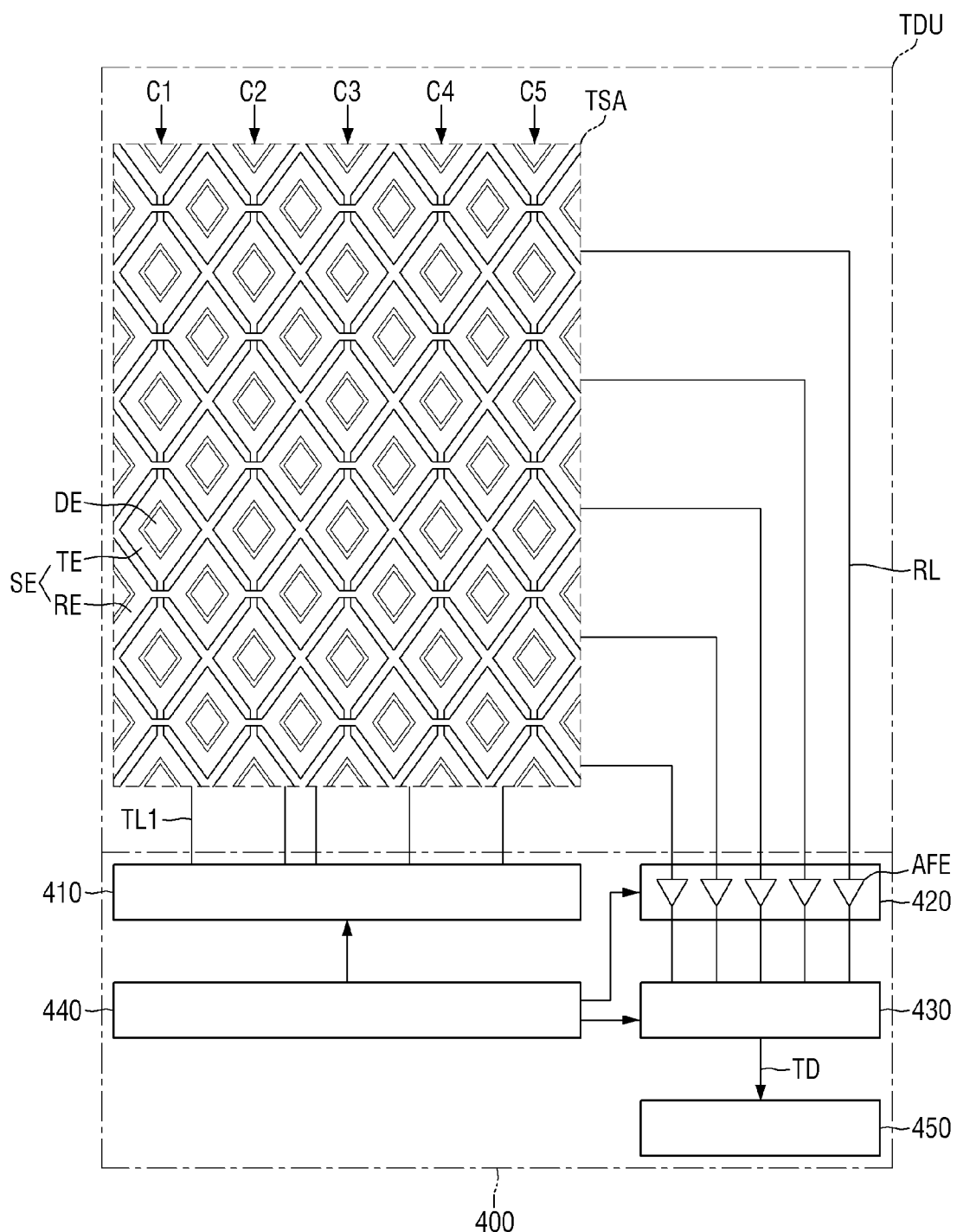
FIG. 7 is a block diagram specifically illustrating a touch sensing unit and a touch driving circuit of a touch sensing device according to an embodiment.

FIG. 7 is a block diagram illustrating a touch sensing unit and a touch driving circuit of a touch sensing device according to an embodiment.

Referring to FIG. 7, a touch sensing device may be a device for recognizing a user's touch. The touch sensing device may include a touch sensing unit TDU and a touch driving circuit 400.

Since the touch sensing unit TDU has been described in detail with reference to FIG. 4, a description of the touch sensing unit TDU will be omitted.

The touch driving circuit 400 includes a driving signal output unit 410, a sensing circuit unit 420, an analog-to-digital converter 430, a touch controller 440, and a touch data compensator 450.

The driving signal output unit 410 outputs touch driving signals to the driving electrodes TE through the first touch driving lines TL1 In FIG. 7, although the second touch driving lines TL2 are omitted for convenience of description, the driving signal output unit 410 outputs touch driving signals to the driving electrodes TE through the second touch driving lines TL2. The touch driving signal may include a plurality of pulses.

The driving signal output unit 410 may output touch driving signals to the first touch driving lines TL1 and the second touch driving lines TL2 in a predetermined order. For example, the driving signal output unit 410 may sequentially output touch driving signals from the driving electrodes TE of the first column C1 disposed at the leftmost side of the touch sensing area TSA to the driving electrodes TE of the fifth column C5 disposed at the rightmost side of the touch sensing area TSA. Other examples may, include a much larger plurality of columns and rows accommodating the driving electrodes TE and sensing electrodes RE.

The sensing circuit unit 420 may be connected to the sensing electrodes RE through the sensing lines RL. The sensing circuit unit 420 may sense a capacitance change in mutual capacitance of the touch nodes TN corresponding to the intersections of the driving electrodes TE and the sensing electrodes RE through the sensing lines RL.

The sensing circuit unit 420 may include operational amplifiers AFE for sensing a capacitance change in mutual capacitance of the touch nodes TN. The operational amplifiers AFE may be connected to the sensing lines RL in a one-to-one manner.

The analog-to-digital converter 430 converts each of the output voltages of the operational amplifiers AFEs of the sensing circuit unit 420 into touch sensing data TD as digital data.

The touch controller 440 controls the driving timings of the driving signal output unit 410, the sensing circuit unit 420, and the analog-to-digital converter 430. The touch controller 440 may output timing signals for synchronization of the driving signal output unit 410, the sensing circuit unit 420, and the analog-to-digital converter 430 to the driving signal output unit 410, the sensing circuit unit 420, and the analog-to-digital converter 430, respectively.

The touch data compensator 450 receives the touch sensing data TD sensed from the touch nodes TNs of the touch sensing area TSA from the analog-to-digital converter 430. The touch data compensator 450 analyzes the touch sensing data TD to calculate a touch area ratio, and compensates the touch sensing data TD according to the touch area ratio.

Figure 8:
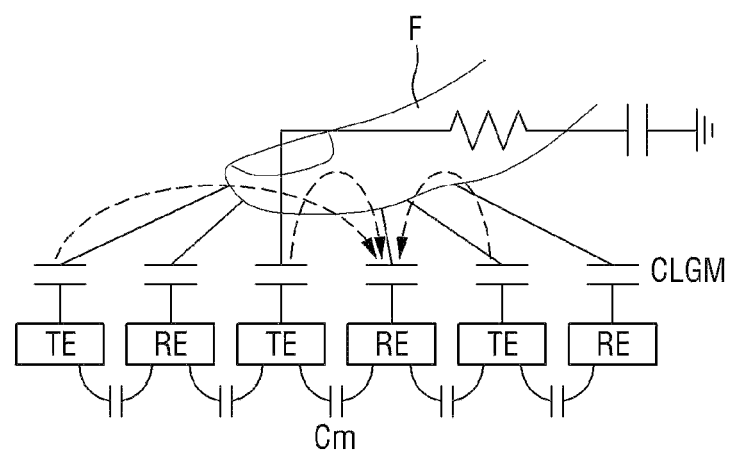
FIG. 8 is a diagram specifically illustrating the retransmission of a charge of capacitance of touch electrodes when a large area touch occurs by a user.

FIG. 8 is a diagram illustrating the retransmission of a charge of capacitance of touch electrodes when a large area touch occurs by a user.

Referring to FIG. 8, mutual capacitance Cm is formed in each of the touch nodes TN corresponding to the intersections of the driving electrodes TE and the sensing electrodes RE. A finger F corresponds to a low ground mass compared to the mutual capacitance Cm formed in each of the touch nodes TN of the touch sensing unit TDU. Therefore, when a touch occurs by the user's finger F, a ground capacitor CLGM may be formed between each driving electrode TE and the finger F and, additionally or alternatively, between each sensing electrode RE and the finger F, which are disposed in an area where the touch occurs.

In general, a charge from the mutual capacitance Cm disposed in the area where the touch occurs by the finger F is discharged to the finger F. Therefore, a capacitance change in the mutual capacitance Cm disposed in the area where the touch occurs by the finger F may be much larger than a capacitance change in the mutual capacitance Cm disposed in the area where the touch does not occur. Accordingly, a touch from a user may be sensed.

However, when a large-area touch occurs by the user's finger F, as shown in FIG. 8, retransmission (as illustrated by dashed arrows), in which the charge discharged from the mutual capacitance Cm to the finger F is transferred to another mutual capacitance Cm, may occur. In this case, although another mutual capacitance Cm is disposed in the area where the touch occurs by the finger F, a difference between the capacitance change in the mutual capacitance Cm where the touch occurs and the capacitance change in the mutual capacitance Cm disposed in an area where the touch does not occur may be small. In this case, the touch sensing data sensed from another mutual capacitance Cm may be smaller than the original intended value, and thus the touch node TN in which another mutual capacitance Cm is formed may not be recognized as an area where the touch occurs.

As shown in FIG. 7, the touch data compensator 450 analyzes the touch sensing data TD to calculate the touch area ratio, and compensates the touch sensing data TD according to the touch area ratio. For example, when the touch area ratio is high, the touch data compensator 450 determines that retransmission has occurred due to a large-area touch, and compensates the touch sensing data TD. Therefore, it is possible to prevent a touch node TN disposed in the area where the large-area touch occurs from being recognized as an area where the touch does not occur. Therefore, it is possible to stably recognize the large-area touch caused by the user.

Figure 9:
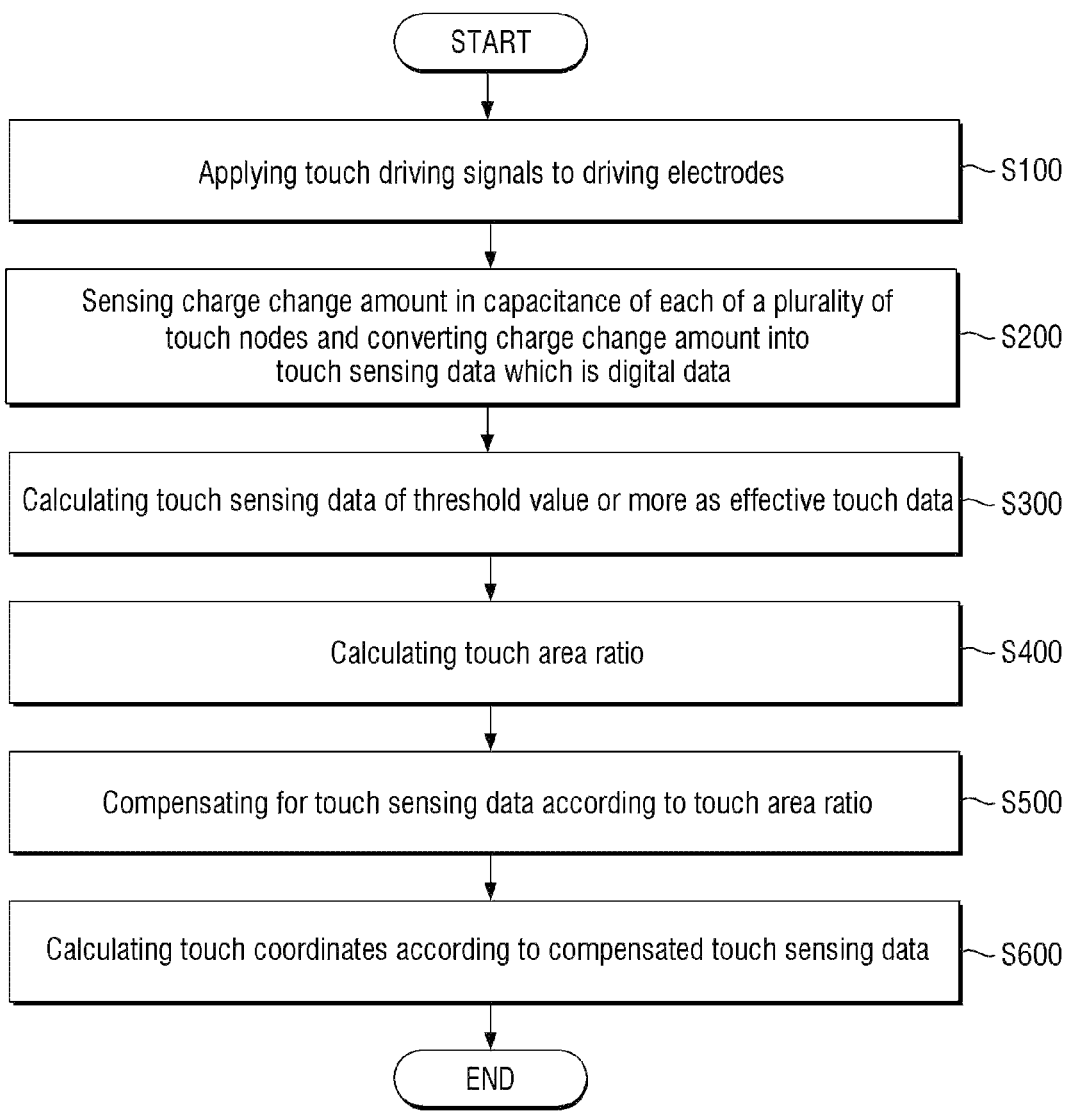
FIG. 9 is a flowchart illustrating a method of driving a touch sensing device according to an embodiment.

FIG. 9 is a flowchart illustrating a method of driving a touch sensing device according to an embodiment. Hereinafter, a method of driving a touch sensing device according to an embodiment will be described in detail with reference to FIGS. 7 and 9.

In a first step, touch driving signals are applied to driving electrodes TE (S100 of FIG. 9). The driving signal output unit 410 outputs touch driving signals to the driving electrodes TE through the first touch driving lines TL1 and the second touch driving lines TL2. The driving signal output unit 410 may output touch driving signals to the driving electrodes TE in a predetermined order.

For example, the driving signal output unit 410 may sequentially output touch driving signals from the driving electrodes TE of the first column C1 disposed at the leftmost side of the touch sensing area TSA to the driving electrodes TE of the fifth column C5 disposed at the rightmost side of the touch sensing area TSA. That is, the driving signal output unit 410 may output touch driving signals to the driving electrodes TE of the first column C1 disposed at the leftmost side of the touch sensing area TSA, and then output touch driving signals to the driving electrodes TE of the second column C2. Thereafter, the driving signal output unit 410 may output touch driving signals to the driving electrodes TE of the third column C3, output touch driving signals to the driving electrodes TE of the fourth column C4, and then output touch driving signals to the driving electrodes TE of the fifth column C5. In this case, the driving electrodes TE in any one column may connect to the driving electrodes TE electrically connected in the second direction (Y-axis direction).

In a second step, the sensing circuit unit 420 senses a capacitance change of each of a plurality of touch nodes TN and converts the capacitance change thereof into touch sensing data TD as digital data (S200 of FIG. 9).

The sensing circuit unit 420 senses a capacitance change in mutual capacitance of the touch nodes TN corresponding to the intersections of the driving electrodes TE and the sensing electrodes RE through the sensing lines RL.

When the driving signal output unit 410 outputs touch driving signals to the driving electrodes TE of the first column C1, the capacitance of each of the touch nodes TN between the driving electrodes TE and the sensing electrodes RE in the first column C1 may be charged. The sensing circuit unit 420 may sense a capacitance change value of each of the touch nodes TN corresponding to the intersections of the driving electrodes TE and the sensing electrodes RE in the first column C1 through the sensing lines RL. For example, the operational amplifier AFE of the sensing circuit unit 420 may sense a capacitance change value of the touch node TN through the sensing line RL connected to this operational amplifier AFE. Further, another operational amplifier AFE of the sensing circuit unit 420 may sense a capacitance change value of the touch node TN through the sensing line RL connected to the operational amplifier AFE.

The analog-to-digital converter 430 converts the capacitance change value of each of the touch nodes TN, sensed by the operational amplifiers AFE of the sensing circuit unit 420, into touch sensing data TD. The analog-to-digital converter 430 outputs the touch sensing data TD to the touch data compensator 450.

In a third step, touch sensing data TD equal to or greater than the first threshold value is calculated as effective touch data VTD (S300 in FIG. 9)

As shown in FIG. 10, the touch data compensator 450 may receive touch sensing data TD from all of the touch nodes TNs in the touch sensing area TSA. As shown in FIG. 11, the touch data compensator 450 calculates touch sensing data TD equal to or greater than a first threshold value among the touch sensing data TD of the touch nodes TNs as effective touch data VTD. The first threshold value may be calculated as a value obtained by multiplying the maximum value of the touch sensing data TD by a predetermined ratio. For example, the predetermined ratio may be 0.1 to 0.5. For example, the predetermined ratio may be 0.3. In FIG. 11, since the first threshold value is 100, the effective touch data VTD may have a value of 100 or more.

In a fourth step, a touch area ratio is calculated (S400 in FIG. 9).

The touch data compensator 450 calculates the number of effective touch data VTD relative to the total number of touch nodes TN in the touch sensing area TSA as a touch area ratio. The touch nodes TN correspond to the intersections of the driving electrodes TE and the sensing electrodes RE. Therefore, the total number of touch nodes TN is equal to the total number of intersections of the driving electrodes TE and the sensing electrodes RE.

In a fifth step, the touch sensing data TD is compensated according to the touch area ratio (S500 in FIG. 9).

The touch data compensator 450 calculates a compensation weighted value of the touch sensing data TD according to the touch area ratio, and applies the compensation weighted value to the touch sensing data TD. The touch data compensator 450 may calculate compensated touch sensing data by multiplying the touch sensing data TD by the compensation weighted value. The method of compensating the touch sensing data TD by the touch data compensator 450 will be described with reference to FIGS. 11 and 12.

Figure 12:
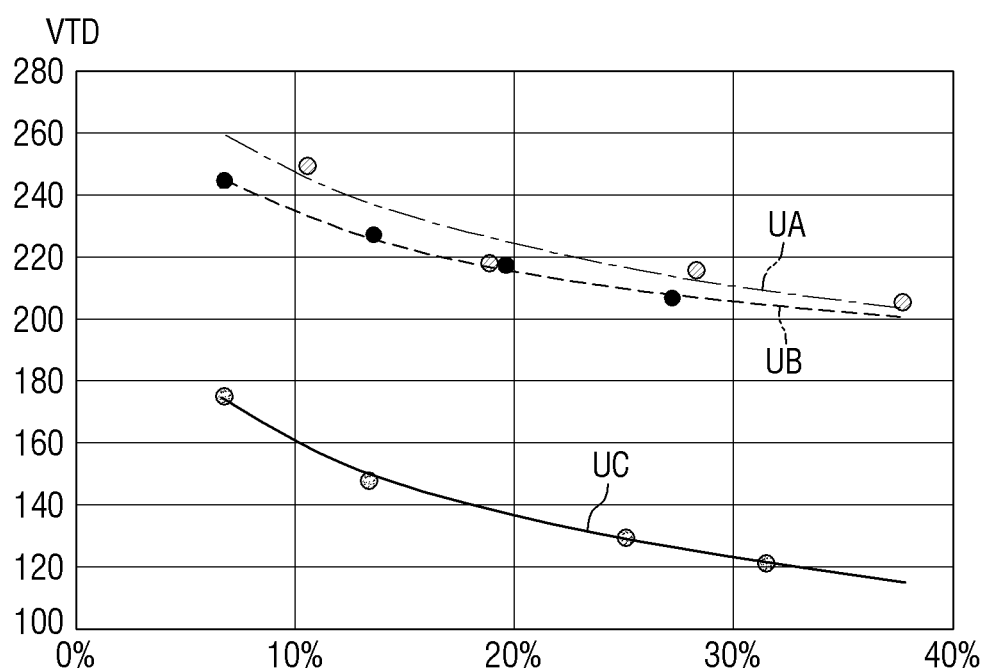
FIG. 12 is a graph illustrating representative values of effective touch data according to a touch area ratio for each user.

FIG. 12 is a graph illustrating representative values of effective touch data according to a touch area ratio for each user.

Referring to FIG. 12, X-axis indicates a touch area ratio, and Y-axis indicates representative values of effective touch data VTD. FIG. 12 illustrates representative values of effective touch data VTD according to the touch area ratios of user A (UA), user B (UB), and user C (UC).

The representative value of the effective touch data VTD may be an average value, a median value, or a maximum value of the effective touch data VTD. In each of user A (UA), user B (UB), and user C (UC), as the touch area ratio increases, the representative value of the effective touch data VTD tends to decrease. As shown in FIG. 8, due to the retransmission of the charge discharged from the mutual capacitance Cm to the finger F in the large-area touch being transferred to another mutual capacitance Cm, as the touch area ratio increases, the value of the effective touch data VTD or the value of the touch sensing data TD may decrease.

Figure 13:
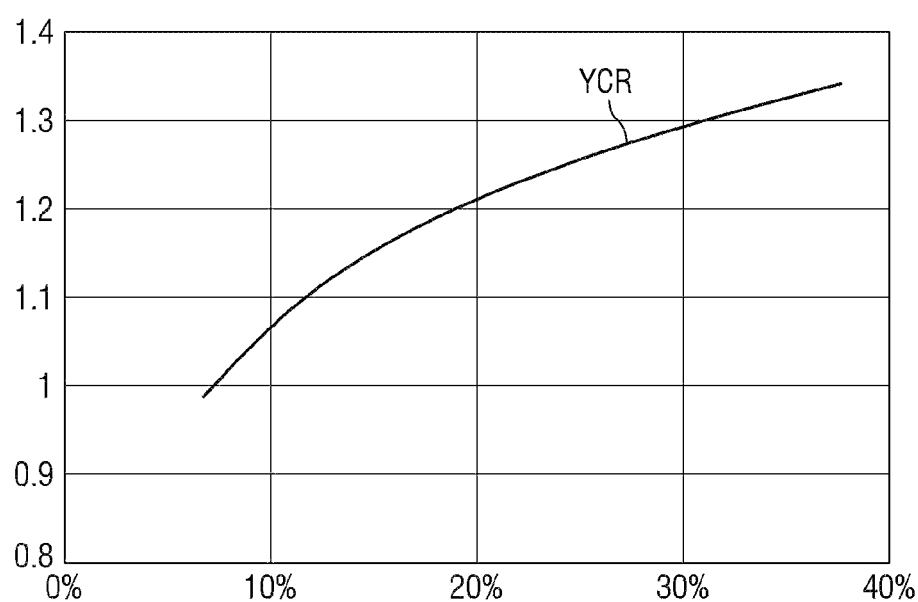
FIG. 13 is a graph illustrating a correction rate of touch sensing data according to a touch area ratio.

FIG. 13 is a graph illustrating a correction rate of touch sensing data according to a touch area ratio.

Referring to FIG. 13, X-axis indicates a touch area ratio, and Y-axis indicates a compensation weighted value of the touch sensing data TD. As the touch area ratio increases, the value of the effective touch data VTD decreases due to the retransmission, and thus the compensation weighted value of the touch sensing data TD may increase. The compensation weighted value of the touch sensing data TD may be proportional to the touch area ratio. The compensation weighted value of the touch sensing data TD may be calculated by Equation 1 below.

$$Y = a \times \ln(x) + b \qquad \text{[Equation 1]}$$

In Equation 1, X indicates a touch area ratio, Y indicates a compensation weighted value of the touch sensing data TD, and each of a and b is a real number. For example, a is 0.207, b is 1.5456, but a and b are not limited thereto.

FIG. 13 shows a compensation weighted value YCR of the touch sensing data TD calculated by Equation 1. The compensation weighted value YCR of the touch sensing data TD calculated by Equation 1 may be 1.0 when the touch area ratio is about 8%, and may be 1.1 when the touch area ratio is about 11%. Further, the compensation weighted value YCR of the touch sensing data TD calculated by Equation 1 may be 1.2 when the touch area ratio is about 19%, and may be 1.3 when the touch area ratio is about 31%.

In a sixth step, touch coordinates are calculated according to the compensated touch sensing data TD (S600 in FIG. 9).

The touch data compensator 450 determines touch sensing data equal to or greater than a second threshold value among the compensated touch sensing data TD. Then, the touch data compensator 450 calculates the coordinates of the touch sensing data equal to or greater than the second threshold value as touch coordinates. The second threshold value may be the same as or different from the first threshold value.

As described above, due to the retransmission of the charge discharged from the mutual capacitance Cm to the finger F in the large-area touch being transferred to another mutual capacitance Cm, as the touch area ratio increases, the touch sensing data TD may decrease. Therefore, as the touch area ratio increases, the compensation weighted value of the touch sensing data TD may increase. Accordingly, it is possible to compensate for a decrease in the touch sensing data TD due to the retransmission in the large-area touch, so that the large-area touch may be stably recognized.

Figure 14:
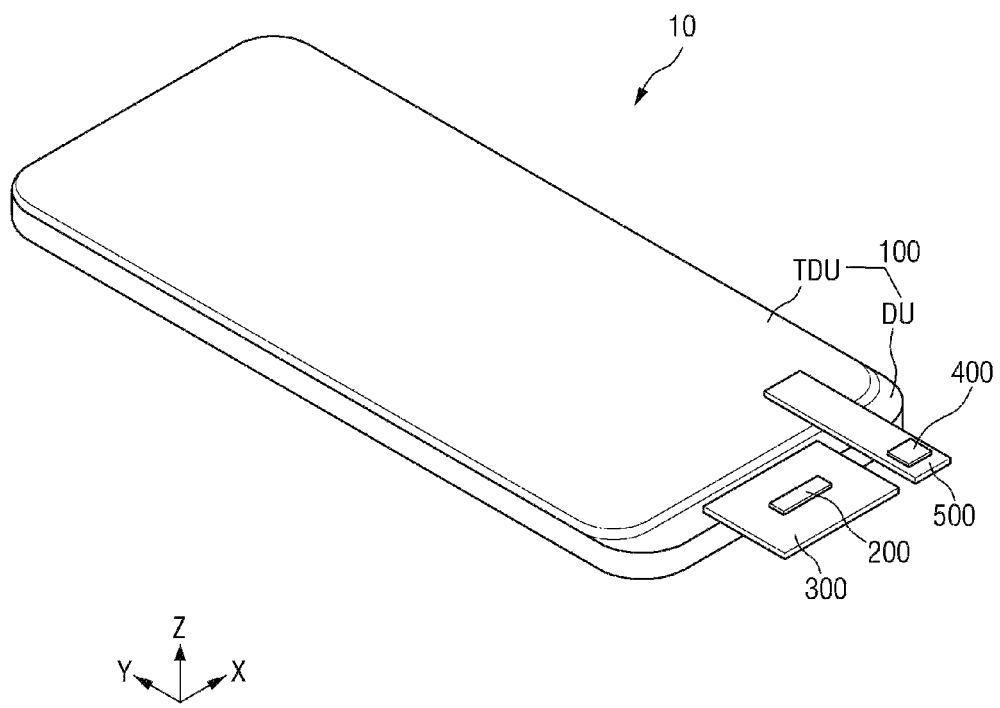
FIG. 14 is a perspective view of a display device according to another embodiment.
Figure 15:
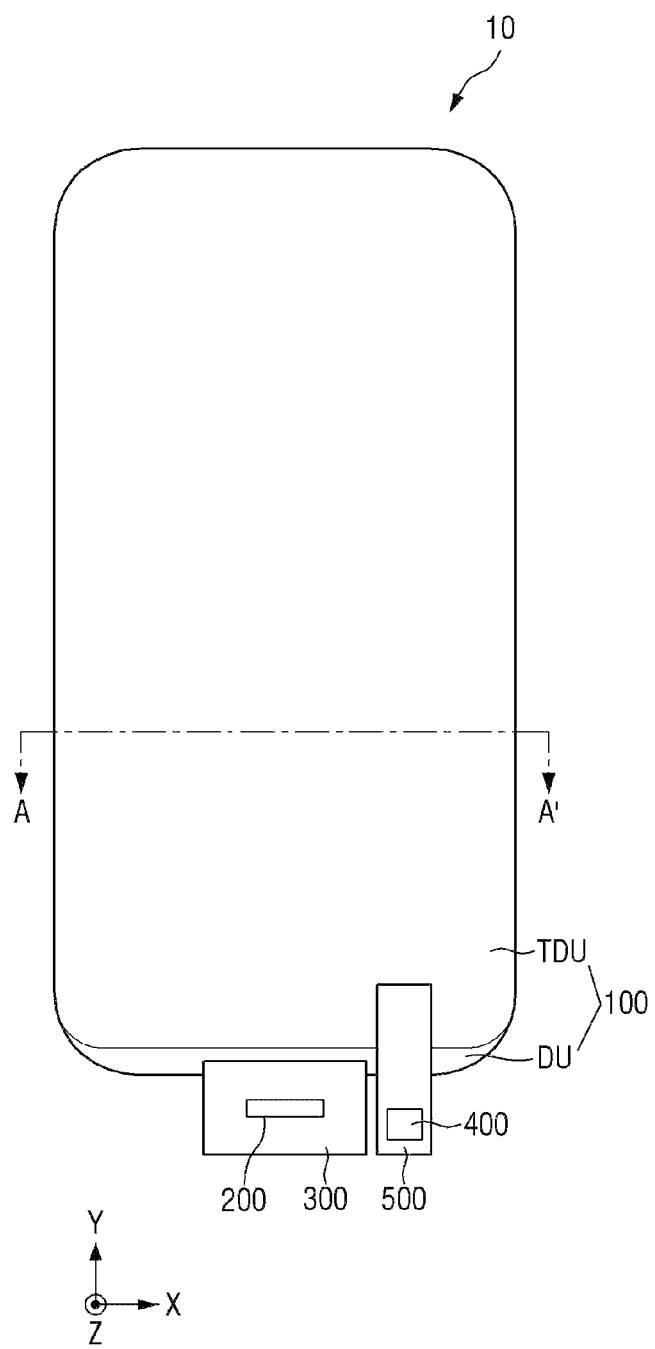
FIG. 15 is a plan view of a display device according to another embodiment.
Figure 16:
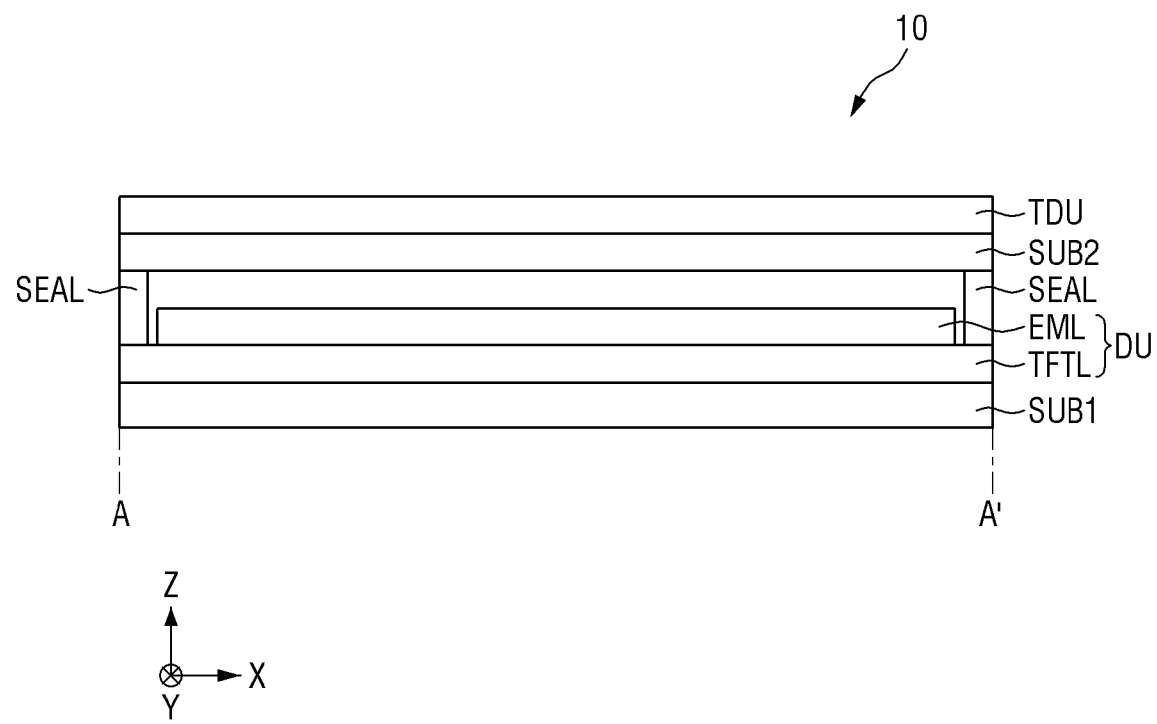
FIG. 16 is a cross-sectional view of a display device according to another embodiment.

FIG. 14 is a perspective view of a display device according to another embodiment, FIG. 15 is a plan view of a display device according to another embodiment, and FIG. 16 is a cross-sectional view of a display device according to another embodiment. FIG. 16 illustrates an example of a display panel taken along the line A-A' of FIG. 15.

The embodiment of FIGS. 14 to 16 is different from the embodiment of FIGS. 1 to 3 in that the display panel 100 includes a first substrate SUB1 on which the display unit DU is disposed, and a second substrate SUB2 on which the touch sensing unit TDU is disposed, and the touch driving circuit 400 is disposed on a touch circuit board 500, not on the display circuit board 300. Differences from FIGS. 1 to 3 will be mainly described with reference to FIGS. 14-16.

Referring to FIGS. 14 to 16, a display device 10 according to an embodiment includes a display panel 100, a display driving circuit 200, a display circuit board 300, a touch driving circuit 400, and a touch circuit board 500.

The display panel 100 includes a display unit DU and a touch sensing unit TDU. The touch sensing unit TDU may be disposed on the display unit DU. Since the area of the touch sensing unit TDU is smaller than that of the display unit DU, a portion of the display unit DU may be exposed without being covered by the touch sensing unit TDU.

The display driving circuit 200 may be formed as an integrated circuit (IC) and attached to the display circuit board 300 in a COF method.

The display circuit board 300 may be disposed on the side of the display unit DU that is exposed without being covered by the touch sensing unit TDU. The display circuit board 300 may be attached to display pads of the display unit DU through a conductive adhesive member such as an anisotropic conductive film.

The touch driving circuit 400 may be disposed on the touch circuit board 500. The touch driving circuit 400 may be formed as an integrated circuit (IC) and attached to the touch circuit board 500.

The touch circuit board 500 may be disposed on one side of the touch sensing unit TDU. The touch circuit board 500 may be attached to touch pads (TP in FIG. 17) of the touch sensing unit TDU through a conductive adhesive member such as an anisotropic conductive film. The touch sensing unit TDU may receive touch driving signals through the touch circuit board 500. The touch circuit board 500 may be a flexible printed circuit board, a printed circuit board, or a flexible film such as a chip-on film.

As shown in FIG. 16, the display panel 100 includes a first substrate SUB1, a thin film transistor layer TFTL, a light emitting element layer EML, an adhesive layer SEAL, a second substrate SUB2, and a touch sensing unit TDU.

The thin film transistor layer TFTL may be disposed on the first substrate SUB1. The light emitting element layer EML may be disposed on the thin film transistor layer TFTL.

The adhesive member SEAL may adhere the thin film transistor layer TFTL to the second substrate SUB2. The adhesive member SEAL may be a frit adhesive layer, an ultraviolet-curable resin layer, or a thermosetting resin layer, but is not limited thereto. The space between the light emitting element layer EML and the second substrate SUB2, sealed by the adhesive member SEAL, may be a vacuum layer. Alternatively, a filling film may be disposed between the light emitting element layer EML and the second substrate SUB2, sealed by the adhesive member SEAL. The filling film may be an epoxy filling film or a silicone filling film, but is not limited thereto.

The second substrate SUB2 may include an insulating material such as a polymer resin. For example, the second substrate SUB2 may include polyimide. The second substrate SUB2 may be a flexible substrate capable of bending, folding, rolling, and the like. The touch sensing unit TDU may be disposed on the second substrate SUB2.

Figure 17:
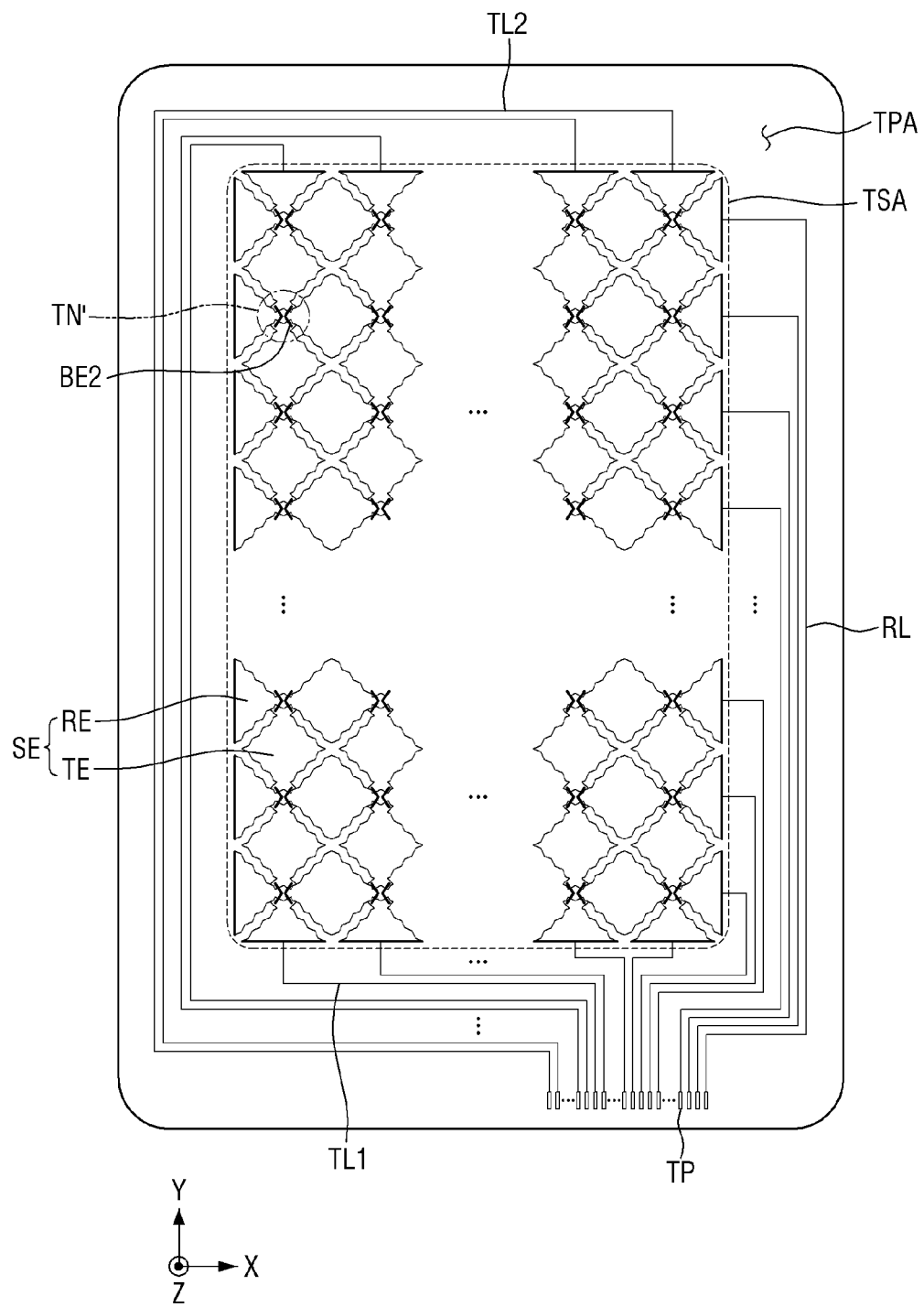
FIG. 17 is a layout view schematically illustrating another example of the touch sensing unit of FIG. 16.

FIG. 17 is a layout view schematically illustrating another example of the touch sensing unit of FIG. 16.

The embodiment of FIG. 17 is different from the embodiment of FIG. 4 in that dummy patterns DE are omitted, and driving electrodes TE and sensing electrodes RE have concave and convex sides on a plane in order to prevent a moire phenomenon from occurring by the driving electrodes TE and the sensing electrodes RE when viewing an image of the display device 10. Therefore, a description of FIG. 17 will be omitted.

Figure 18:
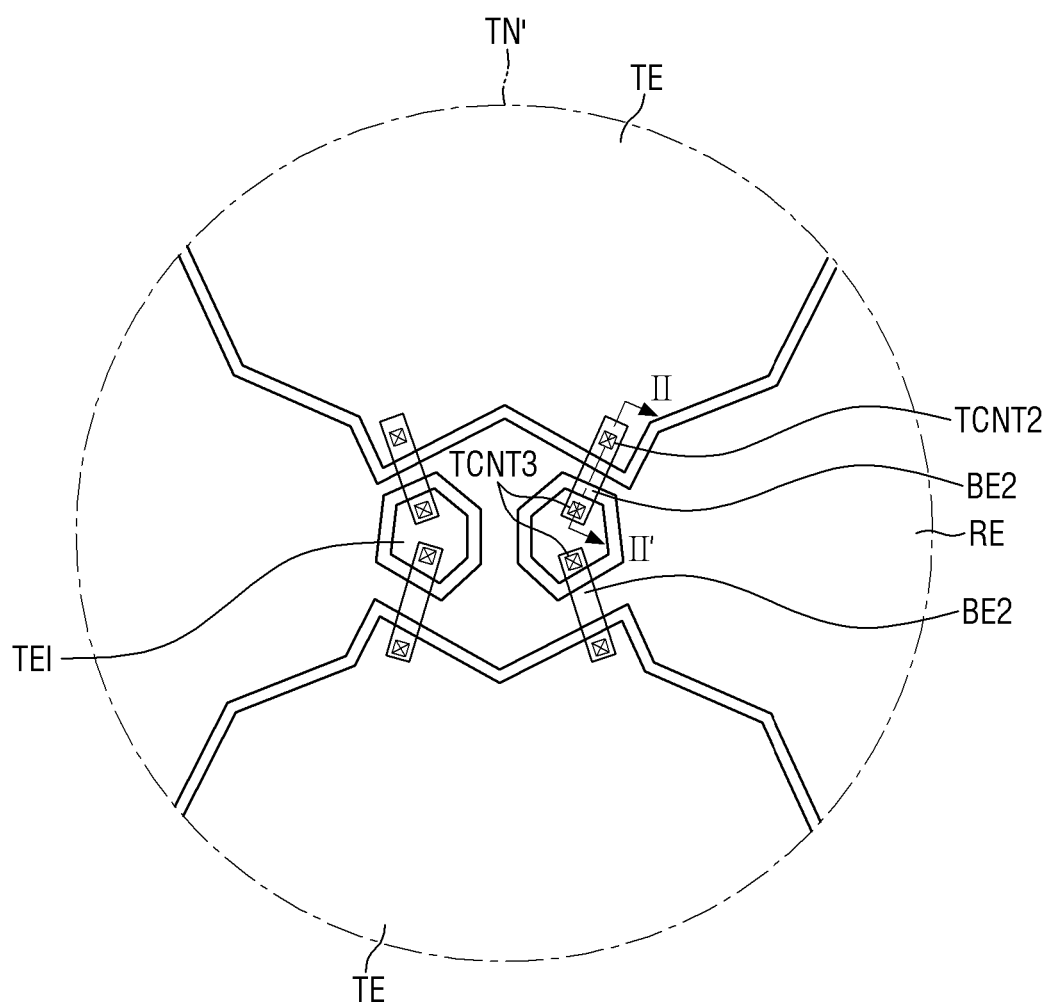
FIG. 18 is an enlarged plan view specifically illustrating an example of the touch node of FIG. 17.
Figure 19:
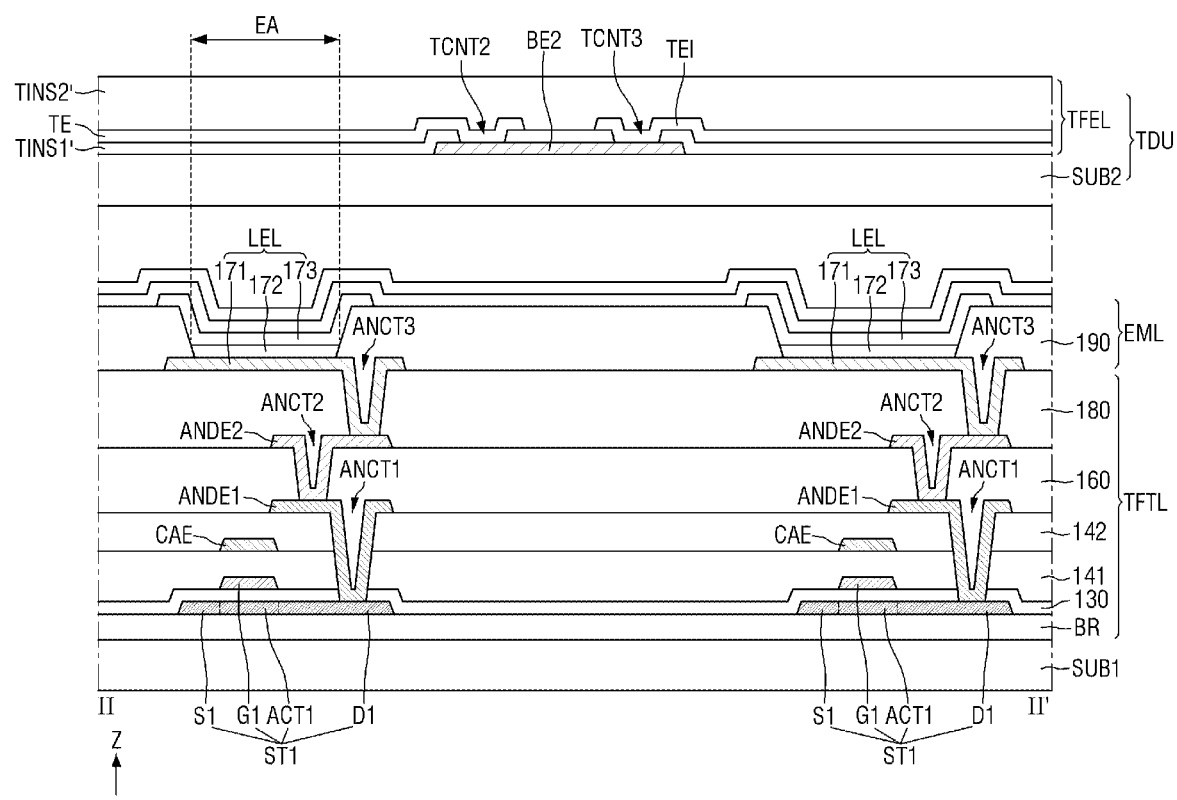
FIG. 19 is a cross-sectional view illustrating an example of a display panel taken along the line II-II' of FIG. 18.

FIG. 18 is an enlarged plan view illustrating an example of the touch node of FIG. 17, and FIG. 19 is a cross-sectional view illustrating an example of a display panel taken along the line II-II' of FIG. 18.

The embodiment of FIGS. 18 and 19 is different from the embodiment of FIGS. 5 and 6 in that the driving electrodes TE and the sensing electrodes RE have an integral form, not a mesh form, and the touch sensing unit TDU includes touch island electrodes TEI. In FIGS. 18 and 19, descriptions overlapping the embodiments of FIGS. 5 and 6 are omitted.

Referring to FIGS. 18 and 19, the second substrate SUB2 is disposed on the light emitting element layer EML. A vacuum layer or a filling film may be disposed between the light emitting element layer EML and the second substrate SUB2.

The touch sensing unit TDU is disposed on the second substrate SUB2. In FIGS. 18 and 19, driving electrodes TE of the touch sensing unit TDU, sensing electrodes RE, touch island electrodes TEI disposed between the driving electrodes TE, and connection electrodes BE2 are illustrated.

Connection electrodes BE2 are formed on the second substrate SUB2. Each of the connection electrodes BE2 connects the driving electrode TE and the touch island electrode TEI. One end of each of the connection electrodes BE2 may be connected to the driving electrode TE, and the other end thereof may be connected to the touch island electrode TEI.

The connection electrodes BE2 may include an opaque metal conductive layer. For example, the connection electrodes BE2 may include a single layer or multiple layers including any one of molybdenum (Mo), aluminum (Al), chromium (Cr), gold (Au), titanium (Ti), nickel (Ni), neodymium (Nd), and copper (Cu), or an alloy thereof. Thus, in order to prevent the aperture ratio of the light emitting areas EA from being lowered, the connection electrodes BE2 do not overlap the light emitting areas EA as shown in FIG. 19, and may be disposed to overlap the bank 190.

A first touch insulating layer TINS1' is formed on the connection electrodes BE2. The first touch insulating layer TINS1' may include an inorganic layer, for example, a silicon nitride layer, a silicon oxynitride layer, a silicon oxide layer, a titanium oxide layer, or an aluminum oxide layer.

The driving electrodes TE, the touch island electrodes TEI, and the sensing electrodes RE are disposed on the first touch insulating layer TINS1'. The driving electrodes TE, the touch island electrodes TEI, and the sensing electrodes RE may be disposed apart from each other. The driving electrodes TE, the touch island electrodes TEI, and the sensing electrodes RE may be electrically separated from each other.

The driving electrode TE may be connected to the connection electrode BE2 through a second touch contact hole TCNT2 penetrating the first touch insulating layer TINS1' to expose the connection electrode BE2. The touch island electrode TEI may be connected to the connection electrode BE2 through a third touch contact hole TCNT3 penetrating the first touch insulating layer TINS1' to expose the connection electrode BE2. Thus, the driving electrode TE and the touch island electrode TEI may be connected to each other through the connection electrode BE2. Accordingly, the driving electrodes TE adjacent to each other in the second direction (Y-axis direction) may be electrically connected.

The driving electrodes TE, the first touch island electrodes TEI, and the sensing electrodes RE may include a transparent metal oxide (TCO) such as ITO or IZO capable of transmitting light. Thus, even when the driving electrodes TE, the first touch island electrodes TEI, and the sensing electrodes RE overlap the light emitting areas EA, the aperture ratios of the light emitting areas EA do not decrease.

A second touch insulating layer TINS2' is formed on the driving electrodes TE, the first touch island electrodes TEI, and the sensing electrodes RE. The second touch insulating layer TINS2' may include an inorganic layer, for example, a silicon nitride layer, a silicon oxynitride layer, a silicon oxide layer, a titanium oxide layer, or an aluminum oxide layer.

In a touch sensing device according to an embodiment of the present inventive concept, touch sensing data may decrease due to the retransmission of a charge discharged from mutual capacitance to a finger in a large-area touch being transferred to another mutual capacitance as a touch area ratio increases. Therefore, as the touch area ratio increases, the compensation weighted value of the touch sensing data TD may increase. Accordingly, it is possible to compensate for a decrease in the touch sensing data due to the retransmission in the large-area touch, so that the large-area touch may be stably recognized.

While the present inventive concept has been particularly shown and described with reference to the embodiments thereof, it will be understood by those of ordinary skill in the art that various changes in form and detail may be made thereto without departing from the spirit and scope of the present inventive concept.

What is claimed is:
1. A touch sensing device, comprising:
touch electrodes;
a sensing circuit unit configured to sense a capacitance change value of each of a plurality of touch nodes formed by the touch electrodes;
an analog-digital converter configured to output the capacitance change value of each of the plurality of touch nodes as digital touch sensing data; and
a touch data compensator configured to analyze the touch sensing data to calculate a touch area ratio and configured to compensate for the touch sensing data according to the touch area ratio by multiplying each value of the touch sensing data by a same compensation weighted value.
2. The touch sensing device of claim 1,
wherein the touch data compensator determines the touch sensing data to be effective touch data when the touch sensing data is equal to or greater than a threshold value, and calculates the number of the effective touch data relative to the number of the plurality of touch nodes as the touch area ratio.
3. The touch sensing device of claim 2,
wherein a value of the effective touch data decreases as the touch area ratio increases.
4. The touch sensing device of claim 3,
wherein the value of the effective touch data is an average value, a median value, or a maximum value of the effective touch data.
5. The touch sensing device of claim 2,
wherein the touch data compensator calculates the compensation weighted value to be applied to the touch sensing data according to the touch area ratio, and the compensation weighted value increases as the touch area ratio increases.
6. The touch sensing device of claim 5,
wherein, when the touch area ratio is X and the compensation weighted value is Y, the compensation weighted value Y satisfies:

$$Y = a \times \ln(x) + b$$

wherein each of a and b is a real number.

7. The touch sensing device of claim 1,
wherein the touch electrodes include driving electrodes and sensing electrodes electrically separated from each other, and
the plurality of touch nodes correspond to intersections of the driving electrodes and the sensing electrodes.

8. The touch sensing device of claim 7,
wherein the analog-digital converter converts a signal from operational amplifiers connected to the sensing electrodes to generate the digital touch sensing data.

9. The touch sensing device of claim 7,
wherein the sensing circuit unit senses a capacitance change value of each of the plurality of touch nodes through each of the sensing electrodes.

10. A display device, comprising:
a display unit including a display area having pixels displaying an image;
a touch sensing unit overlapping the display area and including a touch sensing area having touch electrodes; and
a touch driving circuit electrically connected to the touch electrodes,
wherein the touch driving circuit includes:
a sensing circuit unit configured to sense a capacitance change value of each of a plurality of touch nodes formed by the touch electrodes;
an analog-digital converter configured to output the capacitance change value of each of the plurality of touch nodes as digital touch sensing data; and
a touch data compensator configured to analyze the touch sensing data to calculate a touch area ratio and configured to compensate for the touch sensing data according to the touch area ratio, wherein the touch data compensator determines the touch sensing data to be effective touch data when the touch sensing data is equal to or greater than a threshold value, and calculates the number of the effective touch data relative to the number of the plurality of touch nodes as the touch area ratio.

11. The display device of claim 10,
wherein a representative value of the effective touch data decreases as the touch area ratio increases.

12. The display device of claim 11,
wherein the representative value of the effective touch data is an average value, a median value, or a maximum value of the effective touch data.

13. The display device of claim 10,
wherein the touch data compensator calculates a compensation weighted value to be applied to the touch sensing data according to the touch area ratio, and the compensation weighted value increases as the touch area ratio increases.

14. The display device of claim 13,
wherein, when the touch area ratio is X and the compensation weighted value is Y, the compensation weighted value Y satisfies:

$Y = a \times \ln(x) + b$ wherein each of a and b is a real number.

15. A method of driving a touch sensing device, the method comprising:
sensing a capacitance change value of each of a plurality of touch nodes formed by touch electrodes and converting the capacitance change into digital touch sensing data;
determining the touch sensing data as effective touch data when the touch sensing data is equal to or greater than a threshold value;
calculating the number of the effective touch data relative to the number of the plurality of touch nodes as a touch area ratio; and
compensating for the touch sensing data according to the touch area ratio.

16. The method of claim 15,
wherein a representative value of the effective touch data decreases as the touch area ratio increases.

17. The method of claim 16,
wherein the representative value of the effective touch data is an average value, a median value, or a maximum value of the effective touch data.

18. The method of claim 15,
wherein, in the compensating for the touch sensing data according to the touch area ratio, a compensation weighted value to be applied to the touch sensing data is calculated according to the touch area ratio, and the compensation weighted value increases as the touch area ratio increases.

19. The method of claim 18,
wherein, when the touch area ratio is X and the compensation weighted value is Y, the compensation weighted value Y satisfies:

$Y = a \times \ln(x) + b$ wherein each of a and b is a real number.

* * * * *